United States Patent
He et al.

(10) Patent No.: US 8,175,528 B2
(45) Date of Patent: *May 8, 2012

(54) WIRELESS MASS STORAGE FLASH MEMORY

(75) Inventors: Xiaojie He, Austin, TX (US); Gregory Racino, Austin, TX (US)

(73) Assignee: Spansion LLC, Sunnyvale, CA (US)

( * ) Notice: Subject to any disclaimer, the term of this patent is extended or adjusted under 35 U.S.C. 154(b) by 1086 days.

This patent is subject to a terminal disclaimer.

(21) Appl. No.: 12/050,544

(22) Filed: Mar. 18, 2008

(65) Prior Publication Data

US 2009/0239468 A1  Sep. 24, 2009

(51) Int. Cl.
*H04B 7/00* (2006.01)
(52) U.S. Cl. ...................... 455/41.2; 455/41.1
(58) Field of Classification Search .......... 455/41.1, 455/41.2
See application file for complete search history.

(56) References Cited

U.S. PATENT DOCUMENTS

| | | | | |
|---|---|---|---|---|
| 6,735,434 B2* | 5/2004 | Criss et al. | | 455/418 |
| 7,194,756 B2* | 3/2007 | Addington et al. | | 725/116 |
| 7,925,780 B2* | 4/2011 | Philyaw | | 709/238 |
| 2004/0151136 A1* | 8/2004 | Gage | | 370/328 |
| 2009/0100503 A1* | 4/2009 | Doyle | | 726/3 |
| 2009/0109742 A1* | 4/2009 | Fook et al. | | 365/185.2 |

* cited by examiner

*Primary Examiner* — Tuan H Nguyen

(74) *Attorney, Agent, or Firm* — Turocy & Watson, LLP

(57) ABSTRACT

Systems and/or methods are presented that can facilitate access of a memory device by the use of wireless communication technologies. A memory module is presented which combines memory with a wireless adapter component and a memory controller component to facilitate the wireless transmission and reception of data and/or commands from and to host component that requests access to the memory and the data stored therein. The memory module can dynamically switch between one wireless communication technology to another based on signal strength, signal quality, the distance between the memory module and a host component, power usage, as well as other criteria to facilitate an optimal data transmission or throughput rate.

20 Claims, 13 Drawing Sheets

WIRELESS MASS STORAGE FLASH MEMORY

TECHNICAL FIELD

The subject innovation relates generally to memory systems and in particular, to systems and methodologies that can facilitate access of a flash memory storage device by external processors using wireless communication.

BACKGROUND

A wide variety of memory devices can be used to maintain and store data and instructions for various computers and similar systems. In particular, flash memory is a type of electronic memory media that can be rewritten and retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash and/or NAND flash, for example. NOR flash evolved from electrically erasable read only memory (EEPROM) chip technology in which single byte of data can be erased, and NAND flash evolved from DRAM technology.

Flash memory has become popular, at least in part, because it combines the advantages of the high density and low cost of EPROM with the electrical erasability of EEPROM. Flash memory is non-volatile; it can be rewritten and can hold its content without power. It can be used in many portable electronic products, such as cellular phones, computers, voice recorders, thumbnail drives, and the like, as well as in many larger electronic systems, such as automobiles, airplanes, industrial control systems, etc. The fact that flash memory can be rewritten as well as its retention of data without a power source, small size and light weight have all combined to make flash memory devices a useful and popular means for transporting and maintaining data.

Conventionally, a flash memory can be physically connected to a host (e.g., via a universal serial port (USB)), wherein data can be transferred from a host to the flash memory device. However, it is desirable to improve access to memory devices, such as flash memory devices, as well as make such access more convenient, as compared to conventional memory devices.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

In accordance with one aspect of the disclosed subject matter, a wireless adapter component can be incorporated into a memory module to facilitate access of the memory component in the memory module by a host component using one or more wireless communication technologies. The wireless technologies can include, but are not limited to, Bluetooth, Wi-Fi, Wi-Max, Zigbee, etc. In accordance with an embodiment, the memory module 102 can be part of or embedded in a remote system such as a remote terminal unit (RTU) that can be used for data collection and/or storage. The memory module can function as a host wherein a memory controller component within the memory module can facilitate determining when a wireless communication is to be initiated and what data is to be sent and/or received when transmitting data from the RTU and/or receiving data into the RTU.

In accordance with another aspect of the disclosed subject matter, an antenna component can be used to facilitate wireless access of a memory component. The antenna component can, for example, be used to facilitate the conversion of electric signals containing data, access requests, operation code, commands, etc., into electromagnetic waves, and vice-versa. The antenna can facilitate transmitting and receiving the data-carrying electromagnetic waves, for example. In another aspect, the antenna component can be used to facilitate access of the memory component to one or more host component. In one embodiment, the antenna component and/or wireless adapter component can be comprised of circuitry and antennas to accommodate "Multiple-Input, Multiple-Output" (MIMO) technology whereby the antenna can be comprised of an array of antennas that can be used to enhance transmitted and received signals, for example. In one aspect, the antenna can be a "smart" antenna that can analyze the incoming signals to determine the location of the host components attempting to establish and/or in communication with the memory component.

In another aspect of the disclosed subject matter, a security component can facilitate transmitting and receiving of data, commands, operation code, etc., being transferred between the memory component and the host component(s) in a secure manner. In accordance with one aspect of the disclosed subject matter, the security component can employ various means of authentication to ensure only authorized host components gain access to the data contained within the memory component, for example.

In accordance with another aspect of the disclosed subject matter, the memory component can employ a power supply component and/or a power regulation component. The power supply component and/or power regulation component can, for example, be used to facilitate supplying and/or regulating power to the various components that can be associated with the memory module to facilitate wirelessly transmitting and receiving data. For example, the power supply component can be comprised of, in part, a battery that can store power. The power regulation component can, for example, utilize the power received from the power supply component and can provide the memory module sub-components with virtually any number of different voltages.

In one aspect, the memory module can detect and establish communication with a host component (e.g., a laptop computer), in an ad-hoc or peer-to-peer based communication. In another aspect, the memory module can also communicate with a wireless enabled access port (WAP) or access point (AP) to facilitate access of the memory by various components that can comprise a local area network (LAN) or wireless LAN (WLAN), for example.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following

DETAILED DESCRIPTION

Figure 1:
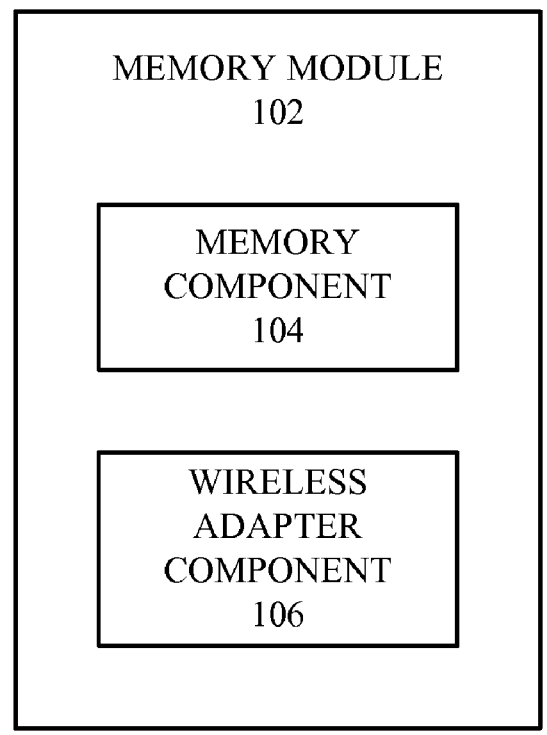
FIG. 1 illustrates a block diagram of a system that facilitates storage o data to a memory in accordance with an aspect of the subject matter disclosed herein.
Figure 1:

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Flash memory devices (e.g., thumb drives, memory sticks, memory cards etc.) have become popular because of their relatively small size, high memory density, and portability as well as the capability of retaining data stored therein without power. However, conventionally, for the stored data to be accessed by a computer or other device, the flash memory device is connected to the computer via a physically hard-wired connection (e.g., flash memory card reader, Universal Serial Bus (USB) port, etc.), which can be inconvenient and can limit the portability of the flash memory device. Hence, to take advantage of the convenience offered by the portability of the flash device, it is desirable to allow access of the flash memory device using wireless technology (e.g., Wi-Fi, Bluetooth, Infrared (IR), etc.).

Systems and/or methods are presented that can facilitate access of a memory module through the use of various wireless technologies. A memory module can comprise a memory component (e.g., flash memory) with a wireless adapter to facilitate the wireless transmission and reception of data and commands to and from an external host component(s) (e.g., laptop, personal data assistant (PDA), computer, server, cellular phone, etc.). For example, read, write, and/or erase commands, along with associated data, can be transmitted between the memory module and a requesting host component using wireless media (e.g., electromagnetic waves, infrared (IR), etc.). The wireless equipped memory module can be used in an "ad-hoc" or "peer-to-peer" arrangement with a single host component or in an "infrastructure" arrangement as part of a local area network (LAN) or wireless LAN (WLAN). In accordance with one aspect of the disclosed subject matter, the memory module can be configured to facilitate the transfer of data to and from two or more host components at the same or substantially the same time.

Turning to FIG. 1, illustrated is a system 100 that can facilitate access of data associated with a memory in accordance with the disclosed subject matter. System 100 can include a memory module 102 that can be comprised of one or more memory component(s) 104, where each memory component 104 can include a plurality of memory locations (e.g., memory cells) (not shown) in which data can be stored and/or accessed. In one aspect, each memory location can store one or more bits of data therein. In another aspect, a memory component 104 can comprise non-volatile memory and/or volatile memory. The nonvolatile memory can include, but is not limited to, flash memory (e.g., single-bit flash memory, multi-bit flash memory), read only memory (ROM), programmable ROM (PROM), electrically programmable ROM (EPROM), electrically erasable programmable ROM (EEPROM), and/or nonvolatile random access memory (NVRAM) (e.g., Ferroelectric random access memory (FeRAM)), and the like. Further, a flash memory can be comprised of NOR flash memory and/or NAND flash memory. The volatile memory can include, but is not limited to, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). It is to be appreciated and understood that, for brevity, the system 100 depicts only one memory component 104 in system 100; however, the disclosed subject matter contemplates that one to virtually any number of memory component(s) 104 can be employed within the memory module 102.

The system 100 can also include wireless adapter component 106 that can facilitate the transmission of data between the memory module 102 and a host component (e.g., laptop, personal computer (PC), cellular phone, etc., such as illustrated in FIG. 2a, FIG. 2b, FIG. 2c, FIG. 3, etc., and described herein) and/or wireless network(s) (e.g., wireless local area networks (WLAN)) (not shown), for example. In accordance with one aspect of the disclosed subject matter, the wireless adapter component 106 can employ a wide range of wireless technologies based in part on different regions of the electromagnetic frequencies and/or infrared (IR) spectrums to facilitate wireless data transmissions between the memory module 102 and the host component(s), for example. Such technologies are detailed in various specifications including, but not limited to: Institute of Electrical and Electronics Engineers (IEEE) specifications 802.x, particularly IEEE 802.11 Wireless Local Area Networks (Wireless LAN, also known as Wi-Fi), IEEE 802.15 Wireless Personal Area Networks (Wireless PAN), IEEE 802.15.1, IEEE 802.15.4, IEEE 802.16 Broadband Wireless Access (Wi-Max), IEEE 802.16e Mobile Broadband Wireless Access, and IEEE 802.22 Wireless Regional Area Network (Wireless RAN). Some of the more common technologies are further detailed below along with technical information regarding frequency ranges, data transmission rates, etc. It is to be appreciated that the disclosed subject matter is not limited to the aforementioned specifications, protocols, and technologies, and that the disclosed subject matter contemplates that virtually any type of wireless specification, technology, and/or protocol can be employed to facilitate wireless communication between the memory module 102 and other components (e.g., host component, as illustrated in FIG. 2 and described herein).

Two wireless technologies that can be employed to facilitate communication in the radio wave region of the electromagnetic spectrum are Bluetooth (e.g., as described in IEEE 802.15.1) and Wi-Fi (e.g., as described in IEEE 802.11). Bluetooth, in comparison with Wi-Fi, can be used to facilitate connection of devices over shorter distances between devices, for example. Typically, for example, Bluetooth technologies can provide a slower throughput of data; however, it can use less power and can be less expensive to produce than other forms of wireless communication. Bluetooth lends itself, for example, to the "ad-hoc" association of a host component that can be in relatively close proximity to the memory module 102 (e.g., within 30 feet of each other); devices in wireless communication over this range can be termed as a wireless personal area network (WPAN).

Wi-Fi communication can provide wireless communication over distances in the region of 100 meters (or more), through "ad-hoc" and/or "infrastructure mode" communication, which can be in conjunction with a wired network to form a wireless local area network (WLAN). For example, an access point can be incorporated into a router attached to an Ethernet network to form a WLAN that can enable the host components to access the wired network components (e.g., servers, terminals, etc.) via the wireless communications.

The wireless adapter component 106 can facilitate converting data, commands, access requests, etc., in the form of electrical signals into electromagnetic signals (e.g., radio waves, IR waves) to facilitate transmission of such information, and accordingly can convert incoming electromagnetic signals into electrical signals to facilitate receiving commands, data, access requests, etc. in the memory module 102 from a host component, where the memory component 104 can facilitate execution of memory operations based in part on the received commands, data, and/or access requests, for example.

In one aspect, the wireless adapter component 106 can be used to facilitate transmission of data from the memory module 102, for example, in response to a read request for data in memory component 104 received from an external device (not shown). The requested data can be retrieved from the memory component 104, whereupon the wireless adapter component 106 (e.g., in conjunction with an antenna component (not shown)), can convert the electrical signal containing the data into an electromagnetic signal to be transmitted to the requesting device, for example. In another aspect, the wireless adapter component 106, in response to a write request by an external device (e.g., a host component) to store data in the memory component 104, can, for example, receive the incoming data in the form of an electromagnetic and/or IR wave and convert the electromagnetic and/or IR wave into an electrical signal. After conversion of the received signal to an electrical signal, the desired operation(s) can be performed and the memory component 104 can store the received data, for example.

In one aspect, a wireless adapter component 106 can comprise circuitry and components to allow the memory module 102 to be accessed by a specific wireless technology or by a variety of technologies. For example, in one embodiment, the wireless adapter component 106 can be designed to be Bluetooth compliant only, thus restricting the memory module to only being able to communicate with other Bluetooth enabled devices. In another embodiment, the wireless adapter component 106 can be multi-wireless accessible allowing a single memory module 102 to be accessed by one or more devices utilizing a multitude of wireless protocols (e.g., Bluetooth, Wi-Fi, Zigbee, Wi-Max, etc.).

In another aspect, the establishment of wireless communications between devices can comprise of a "discovery" (e.g., detection) phase whereby the memory module 102 can broadcast its availability to host components that can be within transmittal range. Alternatively, during the discovery phase, the memory module 102 can also "listen" for broadcasts and inquiries from host components within proximity of the memory module 102 to facilitate establishing a connection between the memory module 102 and an external host component, for example. If a communicable device (e.g., a host component) is located, wireless communication can be established, which can include the transfer of machine access control (MAC) address(es), device names, device classes, list(s) of services available, protocol information, and/or other technical information, such as device features, manufacturer information, clock offset(s), wireless specification (s), etc. If the located device is "known" to memory module 102, (e.g., the memory module 102 has previously authenticated the external host component), the requesting external host component and the memory module 102 can automatically, or through user initiation, begin the transmittal of data to/from the memory module 102, for example.

Figure 2A:
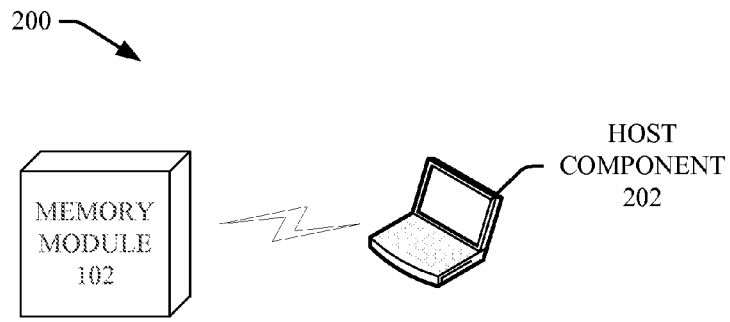
FIG. 2a depicts a block diagram of a system that facilitates communication between a memory module and host component in accordance with an aspect of the disclosed subject matter.
Figure 2B:
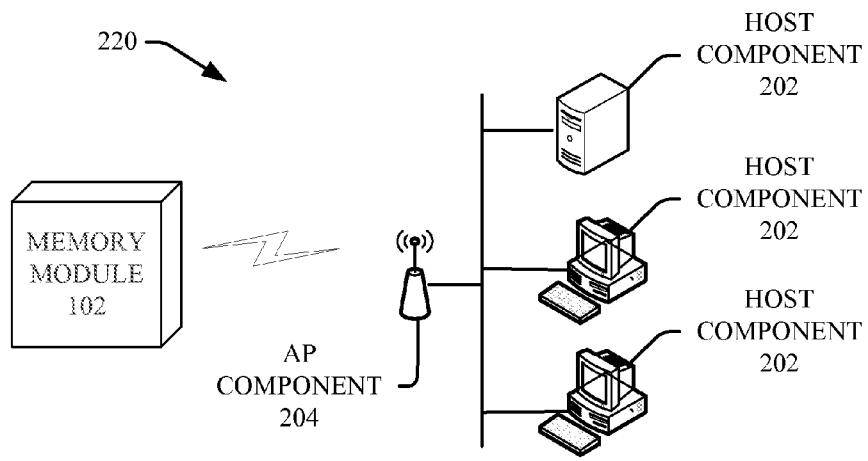
FIG. 2b depicts a block diagram of a system that facilitates communication between a memory component and a network in accordance with an aspect of the disclosed subject matter.
Figure 2C:
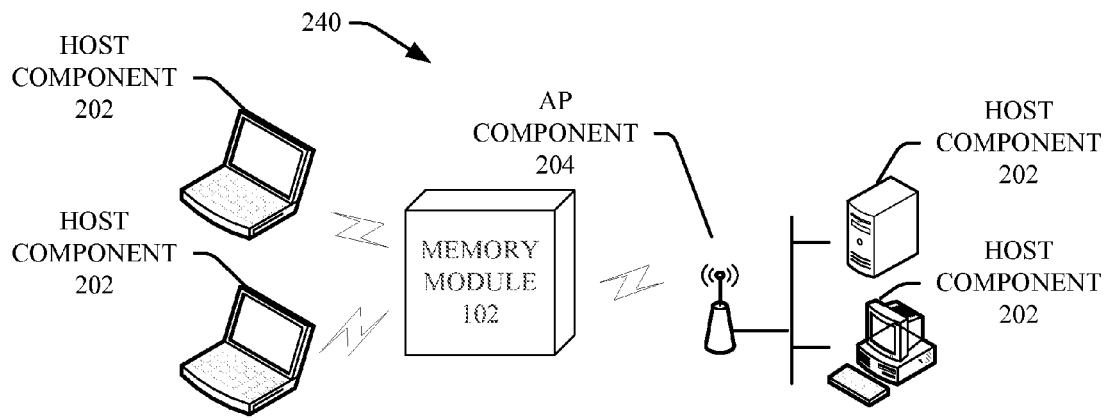
FIG. 2c depicts a block diagram of a system that facilitates communication between a memory component and a plurality of host components in accordance with an aspect of the disclosed subject matter.

Referring to FIGS. 2a, 2b, and 2c, systems 200, 220, and 240 respectively, illustrate respective embodiments in which memory module 102 can facilitate wireless transfer of data in accordance with the disclosed subject matter. In FIG. 2a, a system 200 depicts a memory module component 102 that can act as a client in an "ad-hoc" manner of communication with a host component 202 which can be, for example, a server (e.g., depicted in the FIG. 2a as a laptop computer). "Ad-hoc" mode can relate to two or more devices that can be equipped with wireless adapters to facilitate the establishment of wireless based communications to enable the transfer of commands and/or data between the devices.

FIG. 2b, a system 220 illustrates a memory module component 102 that can associate in an "infrastructure" based communication with a plurality of host components 202, wherein the host components 202 can be associated with a local area network (LAN) network or wireless LAN (WLAN). The LAN and/or WLAN can employ an access point, AP component 204, that can facilitate wireless communication with the memory module component 102 and one or more host components 202, for example. The host components 202 can, for example, be a laptop computer, personal computer (PC), personal data assistant (PDA), cellular phone, etc. The WLAN can be operated in an "infrastructure" mode, wherein the AP component 204 can be used to wirelessly connect one or more host components 202 to the memory module 102, for example. In such an example, the AP component 204 can be used to connect one or more "wired" host components 202 to the memory module 102 via a wireless medium. Alternatively, the system 220 can represent an Extended Service Set (ESS), wherein two or more AP component(s) 204 can be connected to a LAN and/or WLAN; however, for brevity, system 220 only depicts one such AP component 204.

FIG. 2c depicts a system 240 that can be an arrangement where multiple host components 202 can be in communication with a single memory module 102. FIG. 2c depicts, as an example, two host components 202 (e.g., portable computers) and an AP component 204, wherein the AP component 204 can be connected to a LAN and/or WLAN that can communicate with the memory module component 102. It is to be appreciated that, the disclosed subject matter contemplates that the memory module 102 can communicate with the host components 202 connected to the AP component 204 (e.g., in an infrastructure mode) at the same time or substantially the same time as the host components 202 that are not associated with an AP component 204 (e.g., in an Ad-hoc or peer-to-peer mode).

It is to be appreciated the disclosed subject matter contemplates that the memory module 102 (e.g., as depicted in FIGS. 2a, 2b and 2c) can be part of or embedded in a remote system such as a remote terminal unit (RTU) and/or can be a central broadcasting point. In such an aspect, it is to be further appreciated that a wireless communication can be initiated by the memory module 102 (e.g., acting as a host) or by a remote component (e.g., one or more of the host component(s) 202). For example, the memory module 102 can compile data to be transmitted to a host component 202 and initiate a signal to the host component 202 that all the data required for a particular transmission has been compiled and is ready for transmission. Alternatively, a host component 202 can initiate a wireless communication to one or more of the memory module(s) 102 to either send or receive data. In such an aspect, it is to be appreciated that the disclosed subject matter contemplates that the memory module 102 can accommodate acting as a host that can have direct control over the data that can be transmitted and/or received via to/from one of the host component(s) 202. Aspects of the memory module 102 that can facilitate allowing the memory module 102 to function as a host are more fully developed and described herein in regards to FIG. 3.

Figure 3:
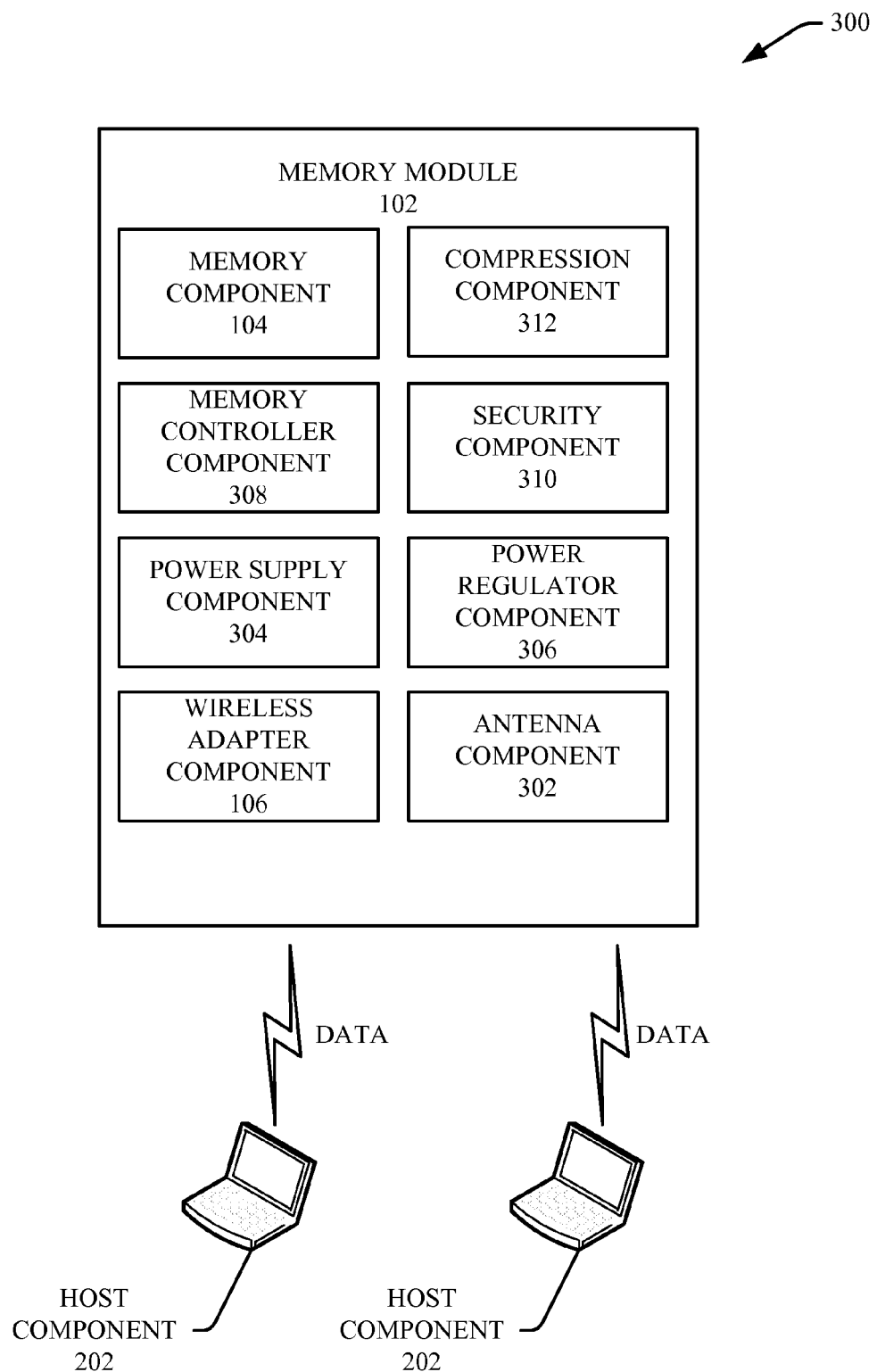
FIG. 3 is a block diagram of a system that facilitates storing data to a memory in accordance with an aspect of the subject matter disclosed herein.

Referring to FIG. 3, depicted is a block diagram of a system 300 that can facilitate the wireless transfer of information to and from a memory in accordance with the disclosed subject matter. System 300 can include a memory module 102, which can be comprised, in part, of a memory component 104 (e.g., non-volatile memory) that can store data. The memory module 102 can further be comprised of a wireless adapter component 106 that can facilitate the wireless transfer of data to and from the memory module 102. The memory module 102, memory component 104, and wireless adapter component 106 can each include their respective functionality as more fully described herein, for example, system 100 and/or system 200.

To facilitate wireless transmission of data, memory module 102 can further include an antenna component 302, wherein the antenna component 302 can facilitate receiving and transmitting electromagnetic waves. In accordance with one aspect of the disclosed subject matter, the wireless adapter component 106 can receive the electromagnetic waves from the antenna component 302 and can, for example, convert electromagnetic waves into electrical signals and vice versa. The antenna component 302 can, for example, be comprised of one or more antenna(s) (not shown) that can be internal and/or external to the memory module 102. In one example, an external antenna can be connected to a coaxial RF connector. In another example, an internal antenna can be etched on to the printed circuit board (PCB) that can house the wireless adapter component 106 or component that can be associated with the memory module 102.

In one aspect the antenna 302 can be a "smart antenna" which can utilize an array of antennas in conjunction with smart signal processing algorithms to identify spatial signal signatures such as direction of arrival (DOA) of an electromagnetic signal, and can use it to calculate "beamforming" vectors to track and locate an antenna beam from one or more of the host components 202, for example. Beamforming, when used to detect an incoming signal, can increase the sensitivity of the receiver in the direction of the signal source, whereby it can focus the antenna component 302 on the incoming signal, for example. When transmitting a signal, beamforming can increase the power in the direction the signal is to be sent to facilitate improved data transmission between the memory module 102 and the host component(s) 202. In another embodiment, the antenna component 302 can be comprised of an antenna array to facilitate using "Multiple-Input and Multiple-Output" (MIMO) technology to facilitate enhancing signals that can be transmitted and received to one or more of the host component(s) 202.

The memory module 102 can also include a power supply component 304 (e.g., lithium battery) that can provide power to facilitate function of the components incorporated within the memory module 102 (e.g., wireless adapter component 106, antenna component 302) to facilitate operating the memory module 102 as a stand-alone device. The power supply component 304 can, for example, be re-chargeable (e.g., a rechargeable battery) and can be charged via power that can be supplied to the memory module 102 by an external power source (not shown), for example. The disclosed subject matter also contemplates that the power supply component 304 can obtain power from an outside source as well.

The memory module 102 can also include a power regulator component 306, wherein the power regulator component 306 can be used to supply a stable output voltage with a regulated voltage level to one or more of the sub-components contained in the memory module 102 (e.g., wireless adapter component 106, antenna component 302). In one aspect, the power regulator component 306 can step up and/or step down the voltage that can be provided by the power supply component 304 to power the various components that can comprise memory module 102. The power regulator component 306 can, for example, supply different voltages to the various components that can be associated with the memory module 102 (e.g., a first voltage to the antenna component 302, a second voltage to the wireless adapter component 106, etc.).

A memory controller component 308 can also be included in system 300. The memory controller component 308 can be used to facilitate determining the type of host component(s) 202 the memory module 102 can communicate with, and the memory controller component 308 can select the desired protocol to facilitate the transfer of data and commands to and/or from the memory module 102, for example. For example, in one embodiment, the memory controller component 308 can detect that a host component(s) 202 (e.g., cellular phone, PDA, laptop, etc.), which can use one or more wireless technologies (e.g., Bluetooth, Wi-Fi, infrared), is trying to wirelessly connect with the memory module 102. The memory controller component 308 can facilitate associating with the host component(s) 202 to facilitate communication between the memory module 102 and the host component(s) 202 using one or more available wireless protocols. In another example, the memory controller component 308 can determine that a local access point (e.g., AP component 204 of FIG. 2b (not shown in FIG. 3)) is attempting to establish wireless communication link with the memory module 102 using a wireless-based protocol. In such an example, the memory controller component 308 can facilitate communication with the AP (e.g., AP component 204) using a Wi-Fi technology, for example. In yet another example, the memory controller component 308 can determine if multiple host components 202 are attempting to associate with the memory module 102, and the memory controller component 308 can respond by determining what type of wireless protocol can be used to most efficiently facilitate data transfers to and from the multiple host components 202, for example.

In accordance with an embodiment, the memory module 102 can be part of or embedded in a remote system such as a RTU (not shown) that can be used for data collection and/or storage. The memory module 102 can function as a host wherein the memory controller component 308 can facilitate determining when a wireless communication is to be initiated and what data is to be sent and/or received when transmitting data from the RTU and/or receiving data into the RTU. In one aspect, that the components of the memory module 102 (e.g., memory controller component 308, security component 310, compression component 312, memory component 104, etc.) can be utilized to facilitate enabling the memory module 102 function as a host.

In another embodiment, where the memory module 102 is in communication with two or more host components 202 and the two or more host components 202 have the ability to communicate via more than one wireless technologies (e.g., Bluetooth, Wi-Fi, Zigbee, or a combination thereof), the memory controller component 308 can be used, in conjunction with the antenna component 302 and the wireless adapter component 106, to determine the distance and/or signal strength of the wireless link between the memory module 102 and the host components 202. The memory controller component 308 can, for example, use such information to select an optimum wireless technology/protocol to facilitate transmitting and/or receiving data to/from the memory module 102. The memory controller component 308 can also use such information relating to power usage and the number of host components 202 that are using a particular wireless protocol to facilitate determining which wireless technology/protocol to use. The memory controller component 308 can, for example, monitor the available power the power supply component 304 can deliver, and if the memory controller component 308 determines that insufficient power is available to facilitate the transmission of data to and from one of the host components 202 using a higher energy demanding technology (e.g., Wi-Fi), the memory controller component 308 can facilitate communicating with the one of the host components 202 with another wireless protocol (e.g., Bluetooth, IR) that can use less power if such other type of wireless access is available given the current parameters (e.g., distance between the memory module 102 and host component 202), for example. For example, the memory controller component 308 can facilitate dynamically switching from one type of wireless communication and protocol (e.g., Wi-Fi) to another type of wireless communication and protocol (e.g., Bluetooth, IR) based in part on a predefined criteria that can relate to the type of protocol, the distance between the host component 202 and the memory module 102, the amount of power consumed or expected to be consumed during respective types of wireless communication, the respective transmission speeds associated with respective types of wireless communication, etc.

The "over-the-air" transmission of data in conjunction with the ability of wireless devices to associate with each other via wireless communication can, for example, make wireless technologies susceptible to various forms of attack by unauthorized users. Such attacks can include: "eavesdropping" involving the interception of wireless transmissions and capture of the information they contain, use of "rogue AP's" to access information from any wireless devices associating with them, "man-in-the-middle" (MITM) attacks where an attacker is able to read, insert and modify data messages, "Denial of Service" (DoS) attacks where a memory device can be shut down as a result of it being saturated with more requests than it can handle at any given moment.

To prevent and/or minimize susceptibility to such attacks, the memory module 102 can include a security component 310. The security component 310 can employ various types of authentication to facilitate authentication of components (e.g., host component 202) and/or entities during the establishment of communications between the memory module 102 and the host components 202. Once authentication has been performed and the memory module 102 begins communication with one or more of the host components 202, the security component 310 can, for example, facilitate the encryption and decryption of data that can be transmitted from and/or to the memory module 102. The security component 310 can facilitate using cryptographic techniques when data is transmitted and/or received to and/or from the memory module 102 to ensure that only the memory module 102 and the intended host components 202 can obtain the data that is transmitted/received.

In another aspect, the memory module 102 can also include a compression component 312 that can provide compression of data by encoding information using fewer bits than an unencoded representation of data would use through use of encoding schemes that can employ data compression algorithms, such as lossless compression algorithms or lossy compression algorithms, for example. The compression component 414 can be used in conjunction with any combination of other electric and/or semiconductor components (e.g., memory controller component 308, wireless adapter component 106, security component) to perform a combination of operations on data to be stored in the memory component 104. In one aspect, the compression component 312 can compress the data to be sent from or to the memory component 104 via the wireless adapter component 106, for example.

Figure 4:
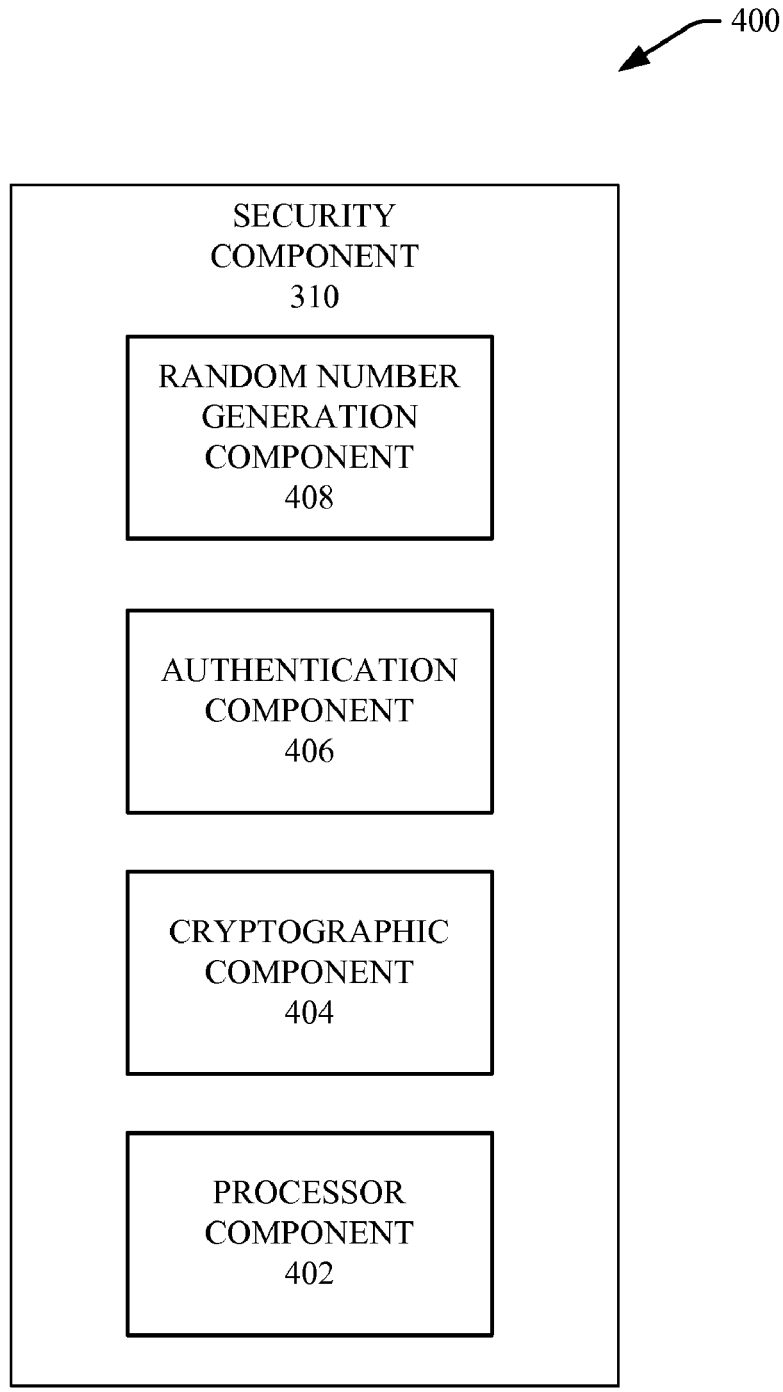
FIG. 4 depicts a block diagram of a system that facilitates encrypting data in accordance with an aspect of the disclosed subject matter.

Turning to FIG. 4, a block diagram of a system 400 that can facilitate the security of data in accordance with an embodiment of the disclosed subject matter is illustrated. In one aspect, system 400 can include a processor component 402 that can be associated with the memory component 104 (not shown) and other components (e.g., cryptographic component 404, authentication component 406) via a bus (not shown). In accordance with an embodiment of the disclosed subject matter, the processor component 402 can be a typical applications processor that can manage communications and run applications. The processor component 402 can generate commands, including read, write, and/or erase commands, in order to facilitate reading data from, writing data to, and/or erasing data from the memory component 104, for example.

The communication of information between the processor component 402, the memory component 104, and other components, can be facilitated via a bus that can be comprised of any of several types of bus structure(s) including, but not limited to, a peripheral bus or external bus, and/or a local bus using any variety of available bus architectures including, but not limited to, Open NAND Flash Interface, Compact Flash Interface, Multimedia Card (MMC), Secure Digital (SD), CE-ATA, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

In one aspect, system 400 can comprise a cryptographic component 404 that can provide various cryptographic tools to facilitate securing data. The cryptographic component 404 can facilitate encrypting and/or decrypting data that can either be stored in a memory component 104 or transferred to another component (e.g., wireless adapter component 106 of FIG. 1 (not shown in FIG. 4), antenna component 302 of FIG. 3 (not shown in FIG. 4)) to be sent to one or more host components (e.g., host components 202 of FIG. 2 (not shown in FIG. 4)). For example, the cryptographic component 404 can facilitate using cryptographic techniques such as, but not limited to, Wired Equivalent Privacy (WEP), Extensible Authorization Protocol (EAP), Protected EAP (PEAP), Transport Layer Security (TLS), Tunneled TLS (TTLS), MD5, Wi-Fi Protected Access (WPA), IP Security Protocol (IPSec), RC4 cipher, Data Encryption Standard (DES), 3DES, Advanced Encryption Standard (AES), Temporal Key Integrity Protocol (TKIP), etc., to encrypt/decrypt data that can be transmitted/received from one or more host components. Additionally, the cryptographic component 404 can provide accelerators and other encrypting/decrypting tools (e.g., Secure Hash Algorithm (SHA) and its variants such as, for example, SHA-0, SHA-1, SHA-224, SHA-256, SHA-384, and SHA-512) to facilitate securing data that can be stored in the memory component 104 or transmitted and/or received to/from one or more host components 202, for example.

System 400 can also contain an authentication component 406 that can solicit authentication data from an entity (e.g., host components 202 of FIG. 2a, FIG. 2b, FIG. 2c, FIG. 3, etc.), and, upon the authentication data so solicited, can be employed, individually and/or in conjunction with information acquired and ascertained as a result of biometric modalities employed, to facilitate controlling access to the memory component 104. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), a physical signature (e.g., PUF), and the like, for example. Additionally and/or alternatively, public key infrastructure (PKI) data can also be employed by authentication component 406. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

In accordance with an aspect of the disclosed subject matter, the system 400 can also include a random number generation component 408. The random number generation component 408 can generate random numbers that can be provided to the cryptographic component 404 to facilitate cryptographic functions, for example. The cryptographic component 404 can utilize the random numbers that can be generated by the random number generation component 408 to facilitate data encryption and/or decryption, such as by utilizing the random numbers to facilitate generation of a key (e.g., private key), to facilitate generation of a digital signature, and/or to facilitate randomization of the cryptographic process, for example, by using a random number to facilitate randomizing the exponentiation of data during a cryptographic process.

In accordance with one aspect, the random number generation component 408 can facilitate generating random numbers and/or raw data having a desired entropy that can be utilized as a physical signature (e.g., PUF) of the memory module 104 and/or a wireless device (e.g., cellular phone, PDA) associated therewith, where the physical signature can be provided to the memory module 102 and stored in a secure portion of a memory component 104 (not shown), for example. In another aspect, the physical signature can be utilized to facilitate authentication of the memory module 102 and/or associated device, for example, by providing the physical signature to another electronic device to facilitate authentication.

Figure 5:
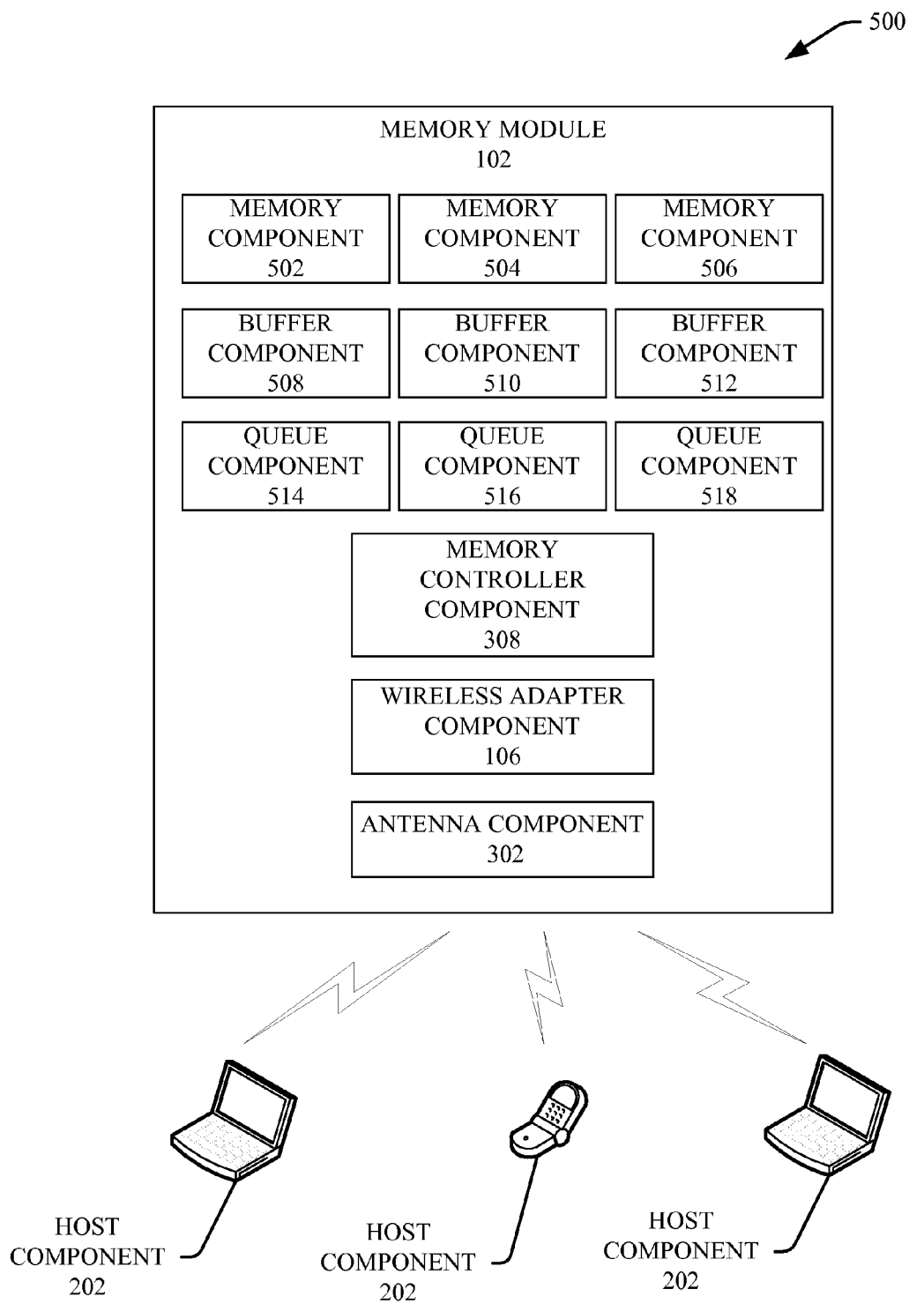
FIG. 5 depicts a block diagram of a system that facilitates buffing data to be stored in a memory in accordance with an aspect of the disclosed subject matter.

Turning to FIG. 5, depicted is an exemplary diagram of a system 500 that can facilitate access of data associated with a memory in accordance with the disclosed subject matter. The system 500 can include a memory module 102, which can be comprised, in part, of a memory component 502, memory component 504, and memory component 506 (hereinafter also referred to "memory components 502 through 506") that can facilitate storing data. It is to be appreciated that that the memory components 502 through 506 can each have the same or similar functionality as described herein with respect to memory component 104, for example, as depicted in system 100 and/or system 300. The memory module 102 can also comprise a memory controller component 308, wherein the memory controller component 308 can facilitate data transfers (e.g., wireless data transfers) between one or more host components 202 and the memory components 502 through 506.

In accordance with one aspect of the disclosed subject matter, the memory module 102 can also include buffer component 508, buffer component 510, buffer component 512 (hereinafter also referred to as "buffer components 508 through 512"), wherein the buffer components 508 through 512 can facilitate buffering data coming from and going to one or more host components 202. In one aspect, the memory module 102 can also include queue component 514, queue component 516, queue component 518 (hereinafter also referred to as "queue components 514 through 518") that can be used, for example, to store commands that can be generated by one or more host components 202 and/or the memory controller component 308.

In accordance with one aspect of the disclosed subject matter, the memory controller component 308 can service one or more memory operations (e.g., read, write, erase, etc.) that can be received and/or transmitted from one or more of the host components 202 to one or more of the queue components 514 through 518, for example. For example, the memory controller component 308 can facilitate placing a read request into a queue component (e.g., 514) while simultaneously facilitate placing a write request from another host component 202 to another queue component (e.g., 516). The memory operation can, for example, be serviced in any order, and the memory controller component 308 can facilitate transferring the data associated with the memory operations (e.g., read, write) to one or more of the buffer components 508 through 512 or directly into one or more of the memory components 502 through 506, for example.

In one embodiment of the disclosed subject matter, the memory controller component 308 can be used to organize and control the throughput of memory requests depending upon the urgency of a request. For example, a read request can be generated by a host component (e.g., one of the host components 202) to read data from a memory component with a QoS service tag that can indicate that the read request has a low priority, while a write request can subsequently be generated from a second host component that can have a QoS service tag that can indicate the write request has a higher priority (e.g., higher than that of the read request). The memory controller component 308 can, for example, facilitate executing the write request before the read request (e.g., wherein the read request/command can stored in one of the queue components 514 through 516) is executed, for example. In one aspect, the memory controller component 308 can analyze the current operation being performed and evaluate whether the time required to complete the in-progress operation would delay a higher priority request by an unacceptable amount of time. In such an example, the memory controller component 308 can temporarily terminate the in-progress operation, and if required, can flag the requesting host component to inform it of the temporary stalling of the transfer of data. Alternatively, the memory controller component 308 can store the information in a buffer component (e.g., 512). The read request can then be serviced, for example, upon completion of the write request. When the higher priority request has been processed, the memory controller component 308 can facilitate finishing the execution of any other processes that were stalled as well, for example.

The system 500 can also include an antenna component 302 that can be used to facilitate access to the memory module 102 by one or more of the host components 202, where the host component(s) 202 can read, write or erase data from the one of the memory components 502 through 506. In accordance with one aspect of the disclosed subject matter, the antenna component 302 can be comprised of one or more antennas (not shown), for example, that can be used to facilitate transmitting and/or receiving the data via electromagnetic waves. The antenna component 302 can, for example, be used to facilitate the conversion of electric signals containing data, access requests, operation code, commands, etc., into electromagnetic waves, and vice-versa.

Figure 6:
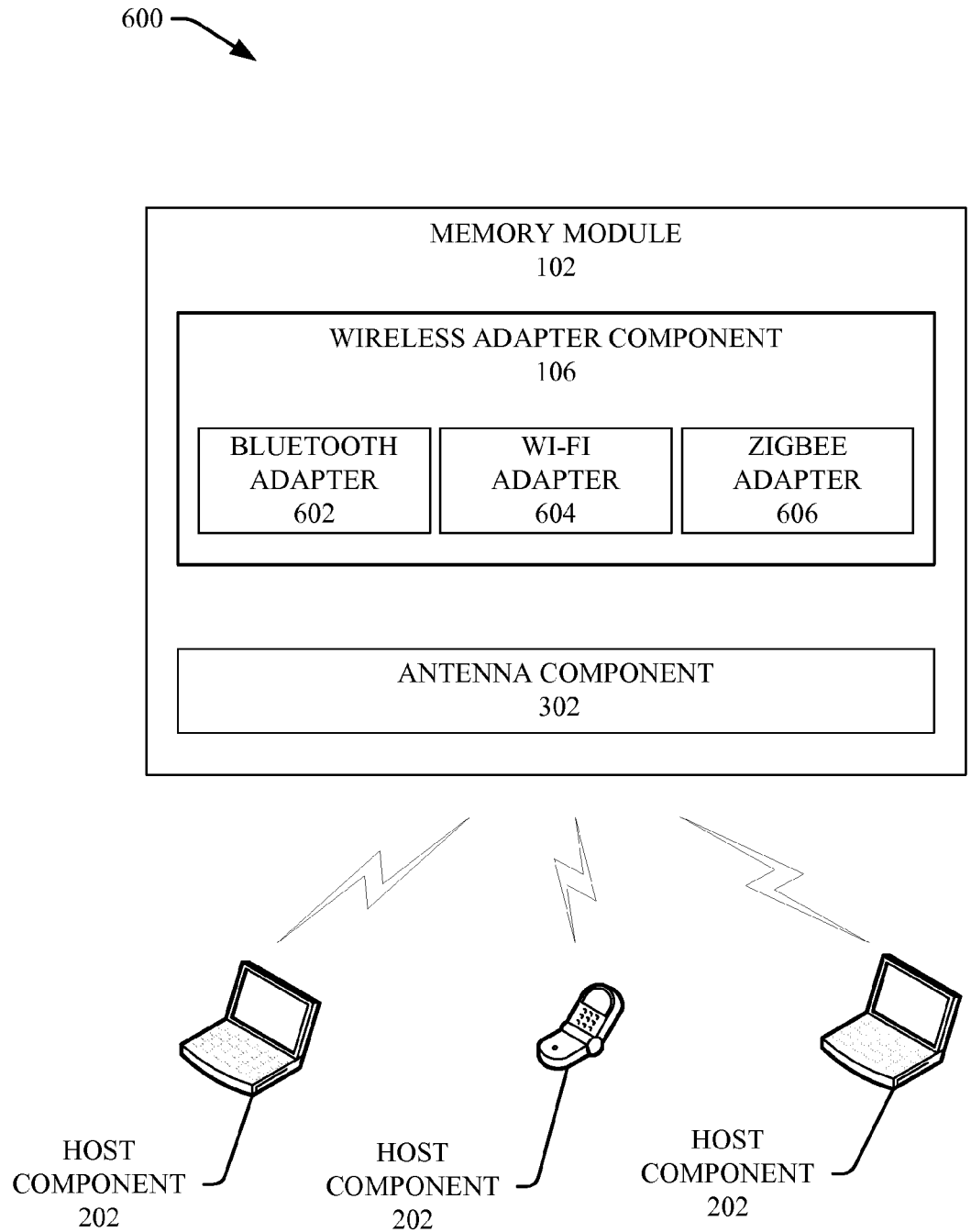
FIG. 6 depicts a block diagram of a system that facilitates accommodating various wireless protocols to store data in a memory in accordance with an aspect of the disclosed subject matter.

Referring to FIG. 6, illustrated is a block diagram of a system 600 that can facilitate access of memory in accordance with an embodiment the disclosed subject matter. System 600 can be comprised of a memory module 102, which can include one or more memory components 104 (not shown) to facilitate the storage of data. In accordance with one aspect of the disclosed subject matter, the memory module 102 can include a wireless adapter component 106 that can be comprised of Bluetooth adapter 602, Wi-Fi adapter 604, Zigbee adapter 606, for example. In one aspect, the wireless adapter component 106 can also communicate at different frequencies and data phase shifts keying schemes. In another aspect, frequency hopping (e.g., jumping to different frequencies) and/or alternating phase shift schemes can be used to increase the communication security and the amount of data that can be transferred, for example.

In accordance with one aspect of the disclosed subject matter, the Bluetooth adapter 602 can, for example, facilitate wireless communication with one or more of host components 202 using the Bluetooth wireless protocol. For example, the Bluetooth adapter 602 can, facilitate establishing such information as device names and device classes for associated host components 202 and provide a list of associated Bluetooth services that the memory module can provide to the host components 202. Likewise, the Wi-Fi adapter 604 can facilitate wireless communication between one or more host components 202 and the memory module 102 by facilitating the use of the various Wi-Fi wireless communication protocols. For example, the Wi-Fi adapter 604 can contain circuitry to accommodate the 802.11a protocol, 802.11b protocol, 802.11g protocol, 802.11n protocol, or a combination thereof. Further, the Zigbee adapter 606 can contain circuitry to facilitate wireless communication between the memory module 102 and the host components 202 using the Zigbee wireless protocol. For example, the Zigbee adapter 606 can contain, for example, low-power digital radios to facilitate high level communication protocols between the memory module 102 and one or more host components 202.

The memory module 102 can also be associated with an antenna component 302 that can facilitate wireless communication with one or more of the host components 202. The antenna component 302 can be comprised of one or more antennas (not shown) and the antennas can be external and/or internal to the memory module 102. The antenna component 302 can, for example, contain one or more antennas and circuitry to accommodate all of the wireless adapters (e.g., Bluetooth adapter 602, Wi-Fi adapter 604, Zigbee adapter 606, etc.) that the wireless adapter component 106 can be associated with. It is to be appreciated that the disclosed subject matter contemplates that the wireless adapter component 106 can be associated with other types of adapters (e.g., IR); however, for brevity, only three such adapters are depicted in system 600.

Figure 7:
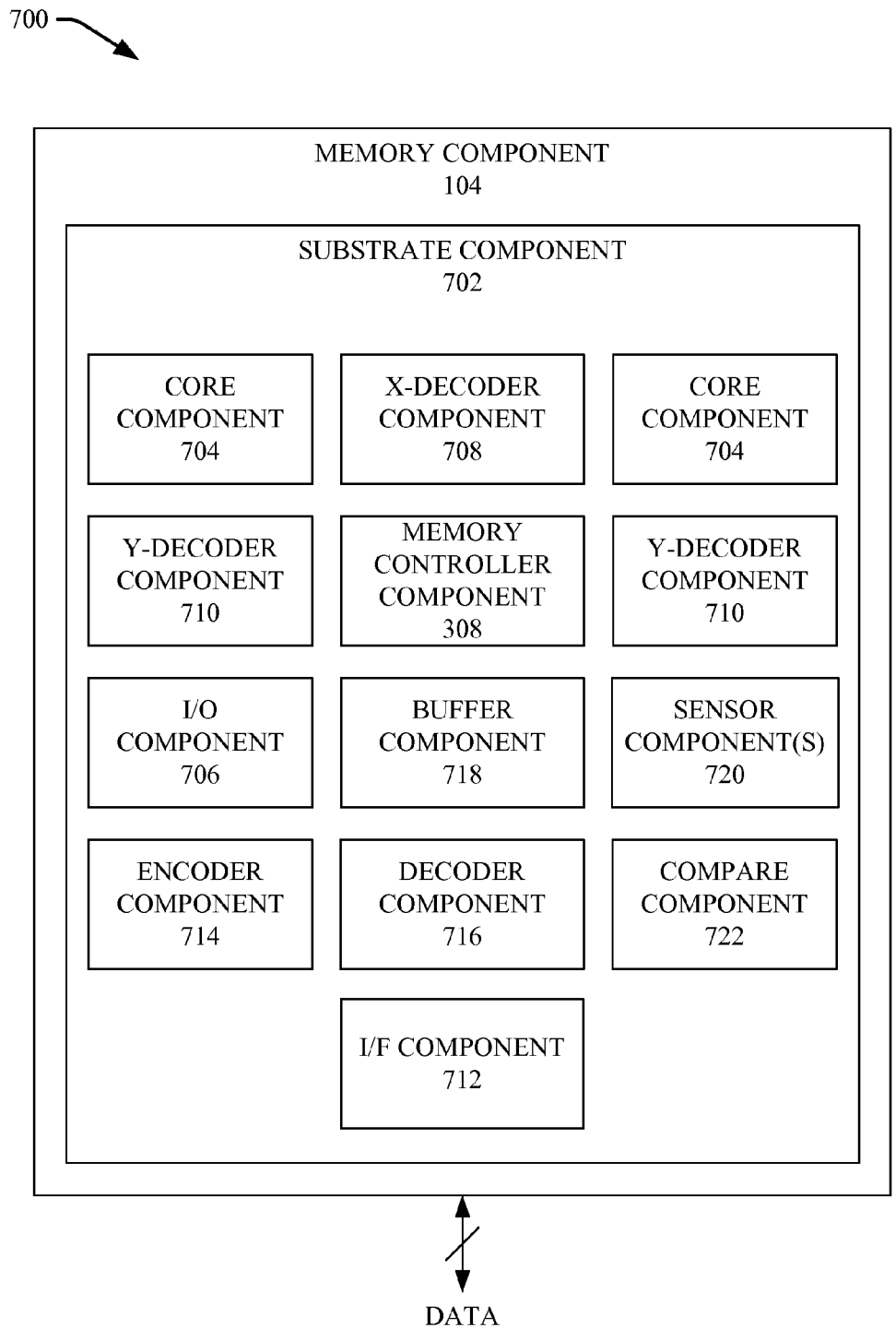
FIG. 7 depicts a block diagram of an example of a system that can store data in accordance with an embodiment of the disclosed subject matter.
Figure 8:
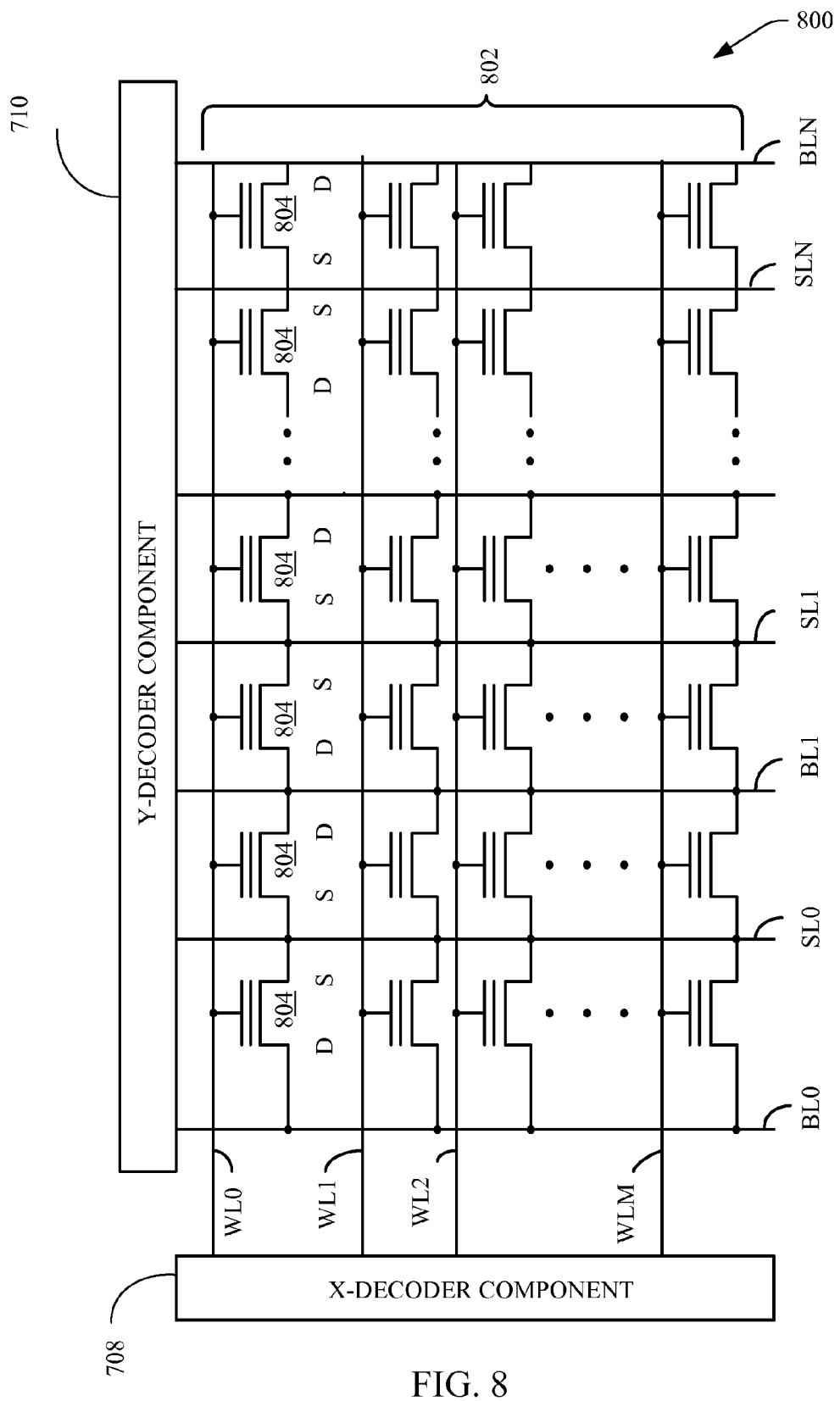
FIG. 8 depicts an example diagram of a system that can facilitate data storage in accordance with an embodiment of the disclosed subject matter.

Turning to FIG. 7, illustrated is a block diagram of a system 700 that can facilitate access and/or storage of data in a memory in accordance with an aspect of the disclosed subject matter. System 700 can include a memory component 104 that can comprise in part non-volatile memory (e.g., single-bit flash memory, multi-bit flash memory) and/or volatile memory (e.g., SRAM). The memory component 104 can include the respective functionality as more fully described herein, for example, system 100 and system 300 and can be comprised of a plurality of memory cells (not shown in FIG. 7, but such as depicted in FIG. 8), which can be memory locations, wherein, for each memory cell, one or more bits of data can be stored, and from which stored data can be written and/or read. The memory module 102 can, for example, facilitate the storing of data that can be wirelessly transmitted from one or more host components (e.g., host components 202 of FIG. 2) (not shown).

In one aspect, the memory component 104 can be formed and/or contained on a substrate component 702 (e.g., semiconductor substrate). In another aspect, one or more core components 704 (e.g., high-density core regions) and one or more lower-density peripheral regions can be formed on the substrate component 702. The core component(s) 704 typically can include one or more M by N arrays (e.g., memory array 802 as depicted in FIG. 8) of individually addressable, substantially identical multi-bit memory cells (e.g., memory cells as illustrated in FIG. 8 and described herein with reference to memory cell(s) 804).

The lower-density peripheral regions can typically include an input/output component 706 (e.g., input/output (I/O) circuitry) and programming circuitry for selectively addressing the individual memory cells. The programming circuitry can be represented in part by and can include one or more x-decoder components 708 and one or more y-decoder components 710 that can cooperate with the I/O component 706 for selectively connecting a source (not shown), gate (not shown), and/or drain (not shown) of selected addressed memory cells to predetermined voltages or impedances to effect designated operations (e.g., programming, reading, verifying, erasing) on the respective memory cells, and deriving necessary voltages to effect such operations. For example, an x-decoder component 708 and a y-decoder component 710 can each receive address bus information, which can be provided as part of a command, and such information can be utilized to facilitate determining the desired memory cell(s) in the memory component 104.

The memory component 104 can receive information (e.g., data, commands, etc.) via an interface component 712 (also referred to herein as "I/F 712"), which can also be formed on substrate component 702. I/F 712 can include and/or provide various adapters, connectors, channels, communication paths, etc. to integrate the memory component 102 into virtually any operating and/or database system(s) and/or with one another system(s). In addition, I/F 712 can provide various adapters, connectors, channels, communication paths, etc., that can provide for interaction and/or communication with a processor component (not shown), and/or any other component, data, and the like, associated with the system 700.

The memory component 104 can also contain an encoder component 714 that can facilitate encoding data being programmed to the memory component 102, where the encoder component 714 also can be formed on the substrate component 702. For example, the encoder component 714 can facilitate converting a digital signal to an analog signal (e.g., current level) to facilitate performing operations (e.g., programming) associated with data in the memory locations (e.g., memory cells) in the memory component 104.

The memory component 104 can further include a decoder component 716 that can facilitate decoding data being read from the memory component 104. The decoder component 716 can receive an analog signal associated with data, where the analog signal can be stored in a memory location that can be associated with the memory components 104, and can facilitate converting the analog signal to a digital signal, so that such digital signal representing the read data can be provided to another component (e.g., memory controller component 308) for further processing. The memory component 104 can also contain a buffer component 718 that can facilitate storage of data, for example, to temporarily store data, being written to and/or read from the memory components 104.

The memory component 104 can also contain a sensor component(s) 720 that can be associated with the memory cell(s) (not shown) to facilitate sensing activity associated with a respective memory cell. The memory component 104 can further comprise a compare component 722 that can facilitate comparing information associated with sensed activity the memory cell(s) with reference information (e.g., reference voltage level(s)). The memory component 104 also can contain a memory controller component 308 that can facilitate controlling the flow of data and/or execution of commands associated with the memory component 104, including the sensing of activity associated with the memory cell(s).

Turning to FIG. 8, depicted is an exemplary diagram of a system 800 that can facilitate data storage in accordance with an embodiment of the disclosed subject matter. The system 800 can include a memory array(s) 802 that can include a plurality of memory cells 804 that each can be comprised of a drain, gate, and/or source. In accordance with an aspect, each memory cell 804 can be a multi-level cell, where data can be represented by the level of charge stored within the memory cells 804. In accordance with another aspect, one or more bits of data can be stored in each memory cell 804. The memory array 802 can be included in a memory component (e.g., 104), such as described in system 100 and system 300, for example. In accordance with one embodiment, the system 800 can be part of a flash memory device (e.g., a NOR flash memory and/or a NAND flash memory).

The system 800 can include an X-decoder component(s) 708 (e.g., word line (WL) decoder) and a Y-decoder component(s) 710 (e.g., bit line (BL) decoder) that can each respectively decode inputs/outputs during various operations (e.g., programming, reading, verifying, erasing) that can be performed on the memory cells 804. The X-decoder component 708 and Y-decoder component 710 can each receive address bus information from a processor component (e.g., 402 of FIG. 4) and/or system controller (not shown) or the like, and can utilize such information to facilitate accessing or selecting the desired memory cell(s) 804 (e.g., memory location(s)) associated with the command. The memory cells 804 can be formed in M rows and N columns. A common WL can be attached to the gate of each memory cell 804 in a row, such as word-lines WL0, WL1, WL2, through WLM. Common bit lines (BLs) and source lines (SLs) can be attached to each cell 804 in a column, such as bit-lines BL0, SL0, BL1, SL1 through BLN, SLN. A WL can contain, for example, a plurality of elements (e.g., 512, 1024, 2048, etc.) forming multiple words. A sector can include a plurality of WLs, such as, for example, 512 WLs that can provide 512 k or more elements of memory, where there can be a plurality of sectors in a memory array 802. In accordance with an aspect of the disclosed subject matter, respective voltages can be applied to one or more memory cells 804 through the WLs, BLs and/or SLs to facilitate performing operations, such as program, read, erase, and the like. It is to be appreciated that that the X-decoder component 708 and Y-decoder component 710 can include the respective functionality as more fully described herein, for example, system 700.

It is to be appreciated that while the memory cells 804 are shown as being respectively associated with a drain and a source, in accordance with one embodiment, where a memory cell 804 contains charge storage elements on two sides of a transistor associated with a cell 804 that can each be programmed, the drain can act as the source, and/or the source can act as the drain, depending on which portion of the memory cell 804 is being charged during a given operation.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 9-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
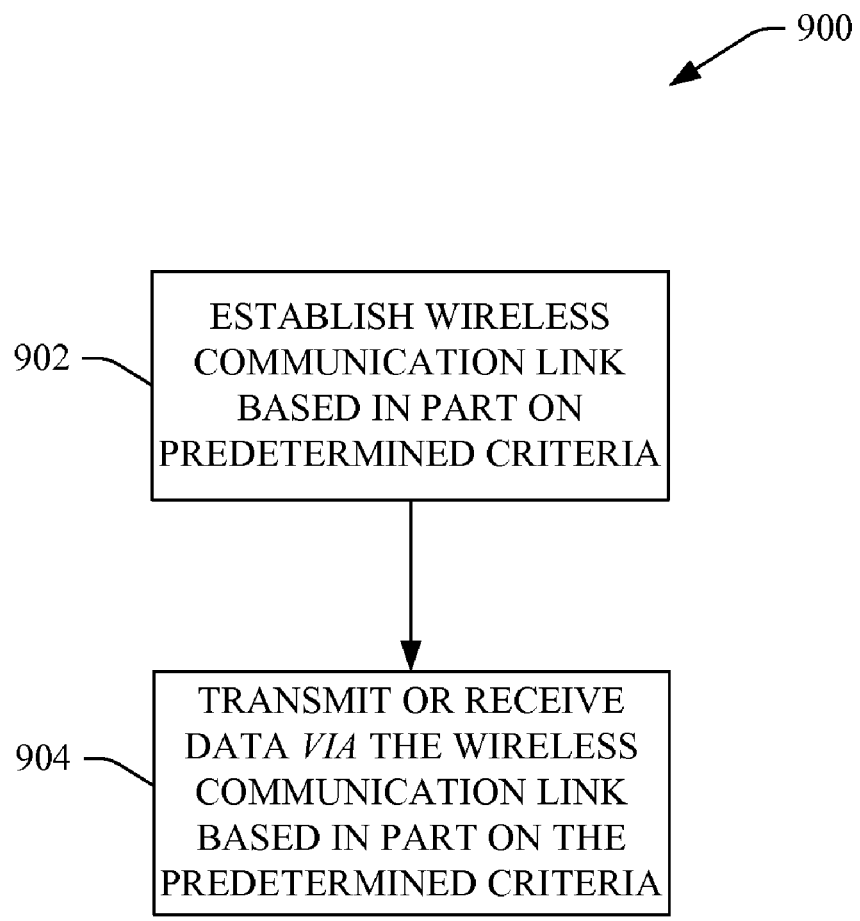
FIG. 9 depicts a methodology that can facilitate transferring data to a memory in accordance with an aspect of the disclosed subject matter.

FIG. 9 depicts a methodology 900 that can facilitate wireless transmission of data associated with a memory in accordance with the disclosed subject matter. At 902, a wireless communication link can be established based on predetermined criteria. A memory module (e.g., memory module 102 of FIG. 1 and/or FIG. 3) in conjunction with a wireless adapter component (e.g., wireless adapter component 106 of FIG. 1, FIG. 3, FIG. 5, and/or FIG. 6), an antenna component (antenna component 302 of FIG. 3 and/or FIG. 5), a memory controller component (e.g., memory controller component 308 of FIG. 3 and/or FIG. 5) can establish a wireless communications link to one or more wireless devices (e.g., host components 202 of FIG. 2a, FIG. 2b, FIG. 2c, FIG. 3, FIG. 5, and/or FIG. 6). The antenna component can be comprised of, for example, a transducer that can convert electromagnetic waves into electronic signals and vice-versa.

The wireless communication link can be based on predetermined criteria. The predetermined criteria can be or can relate to, for example, but are limited to, a desired throughput (e.g., transmission speed) between the memory module and a host component, the distance between the memory module and the host component, the number of host components that are using a particular wireless protocol (e.g., that can interfere with each other), the signal strength of one wireless protocol over another, the signal quality of one wireless protocol over another, a desired power usage with respect to one wireless protocol over another or a combination thereof.

In one aspect, the predetermined criteria can be based in part on the distance between a host component and a memory module when the wireless adapter component 106 attempts to establish a wireless communication link. For example, if a host component is within a relatively close range to the memory module (e.g., 10 meters), the wireless adapter component can establish a wireless protocol that can use lower power than other types of wireless protocols (e.g., Bluetooth or Zigbee as compared to Wi-Fi).

In another aspect, the predetermined criteria can be based in part on the amount of power remaining within the memory module. For example, the wireless adapter component, and/or the memory controller component (e.g., memory controller component 308 of FIG. 3) can make a determination on what wireless communication protocol to use based in part on the amount of remaining power that the memory module can have available. It is to be appreciated that the wireless adapter component and/or the memory controller component can also obtain information from a power supply component (e.g., power supply component 304 of FIG. 3) and/or a power regulator component (e.g., power regulator component 306 of FIG. 3) to assist in making the determination, for example. If, for example, the amount of power available passes below a predetermined threshold level, which can, for example be obtained from the power supply component and/or power regulator component, the wireless adapter component and/or memory controller component can facilitate the determination of which wireless communication protocol to use to establish a wireless communication link based in part on the power consumption of the plurality of wireless communication protocols that are available.

In yet another aspect of the disclosed subject matter, the predetermined criteria can be based on the number of host component using a particular wireless protocol. For example, the wireless adapter component and/or the memory controller component can determine that one wireless protocol (e.g., Wi-Fi) has a degraded signal (e.g., due to a high number of host components using the same wireless protocol) and determine that another available wireless protocol (e.g., Bluetooth) has less interference. In such an example, the wireless adapter component and/or the memory controller component can facilitate changing (e.g., dynamically switching) the wireless protocol from the wireless protocol that is experiencing interference (e.g., Wi-Fi) to the wireless protocol that has less interference (e.g., Bluetooth), for example. Likewise, the wireless adapter component and/or memory controller component can switch (e.g., dynamically switch) between one wireless protocol to another if a particular wireless protocol is experiencing degraded signal quality or signal strength, for example.

In one aspect, the type of wireless communication protocol can be Bluetooth, for example, while in another aspect the wireless communication can be Wi-Fi, Zigbee, IR, or Wi-Max wireless communication protocol. The wireless adapter component can, for example, scan the airwaves for the appropriate frequencies that can correspond to virtually any number of different wireless communication protocols and determine the optimal wireless protocol to use for a particular host component. In one aspect, a particular host component can only communicate via one wireless communication protocol (e.g., Bluetooth), wherein the host component being able to only communicate via the one wireless communication, thus prescribing the predetermined criteria to be that all wireless communication between the memory module (e.g., via the wireless adapter component and/or the antenna component) and the host component be performed on the only wireless communication protocol the host component can accommodate (e.g., Bluetooth).

In one embodiment, the wireless adapter component can, for example, establish a wireless communication link in a peer-to-peer (P2P) or "ad-hoc" manner. In another embodiment, the wireless adapter component can, for example, establish a wireless communication link with a host component that can be part of a local area network (LAN) whereby the wireless communication link can be established in an infrastructure configuration via employing the use of an AP component (e.g., AP component 204 of FIG. 2b). It is to be appreciated that that the disclosed subject matter contemplates that an antenna component (e.g., antenna component 302 of FIG. 3) and/or the wireless adapter component can be configured to establish a wireless communication link using a range of wireless protocols e.g., by Bluetooth, Wi-Fi, Wi-Max, Zigbee, etc., thus facilitating wireless communication between the memory module and one or more host components using a wide range of wireless protocols, for example. For example, the wireless adapter component, memory controller component, antenna component or a combination thereof can support a range of wireless protocols can facilitate the access of the memory module by Bluetooth technology used in one instance by a host component, while the wireless adapter component, memory controller component, antenna component or a combination thereof can establish a wireless communication link with another host component using one or more of the Wi-Fi technologies (e.g., 802.11a, 802.11b, 802.11g, 802.11n, etc.).

At 904, data can be transmitted and/or received via the wireless communication link based on the predetermined criteria. For example, a host component (e.g., host components 202 of FIG. 3) can request data from the memory module (e.g., memory module 102 of FIG. 1) to retrieve information from one or more memory components (e.g., memory components 104 of FIG. 1) via the wireless communication link. In one aspect, one or more buffer components (e.g., buffer components 508 through 512 of FIG. 5) and/or a queuing component (e.g., queue components 514 through 516 of FIG. 5) can be used to facilitate transferring the requested data from the memory module 102 to the requesting host component, for example. In one instance, two or more host components can request to read and/or write data to/from one or more of the memory components at the same time.

For example, a first host component can request a write access to one or more of the memory components contained within the memory module, while a second host component can request a read access to one or more of the memory components contained in the memory module. In one aspect, the memory controller component can utilize one or more of the queue components to control the order of the write and read requests from the first host component and the second host component. For example, the read request may have a higher quality of service (QoS) tag associated with the read request than that of the write request, and the memory controller component, in conjunction with the queue component(s), can facilitate allowing the read operation requested by the first host component to be performed prior to the write request from the second host component. At this point, methodology 900 can end.

Figure 10:
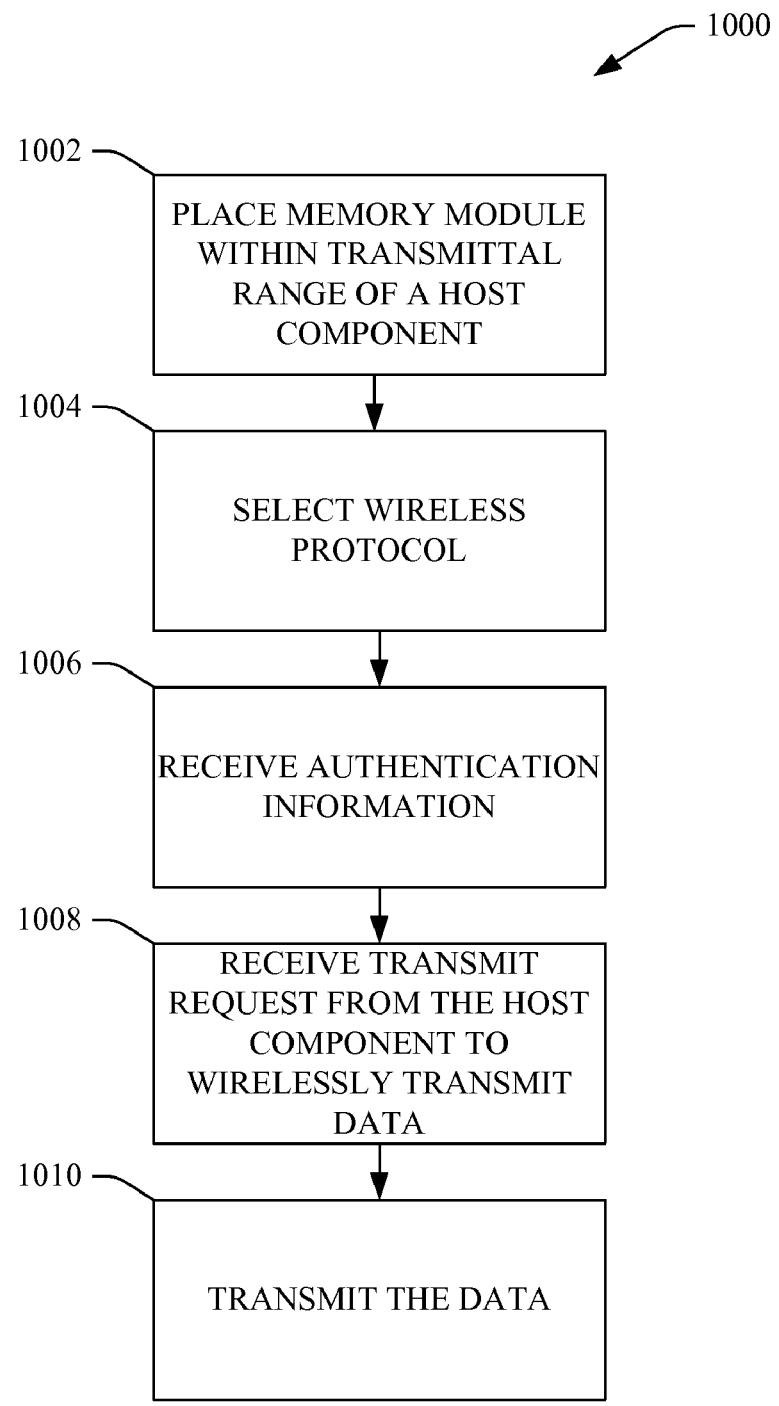
FIG. 10 depicts a methodology that can facilitate transferring data to a memory in accordance with an aspect of the disclosed subject matter.

Turning to FIG. 10, illustrated is a methodology 1000 that can facilitate the access of memory using wireless technology in accordance with the disclosed subject matter is illustrated. At 1002, the memory module can be placed within range of a host component. For example, a memory module (e.g., memory module 102 of FIG. 1) that can contain one or more memory components (e.g., memory components 104 of FIG. 1, memory components 502 through 506 of FIG. 5) can be placed within transmittal range of a host component (e.g., one of the host components 202 of FIG. 5).

At 1004, a wireless communication protocol between the memory module and the host component can be selected. In accordance with one aspect of the disclosed subject matter, the host component can send information regarding the number and type of available wireless protocols (e.g., Bluetooth, Wi-Fi, IR) the host component has available to communicate with the memory module. For example, the host component can have two types of wireless communication protocols (e.g., Wi-Fi and Bluetooth) and can transmit such information via one of the two wireless protocols to the memory module. The wireless adapter component in conjunction with the memory controller component (memory controller component 308 of FIG. 3), for example, can determine the optimum wireless communication protocol to use with the host component. Such a selection can, for example, be based on the distance the host component is from the memory module, the amount of power the memory module has available, the speed at which the data is required to be transferred etc. It is to be appreciated that that the amount of power the memory module has available can be determined via information that can be received from a combination of components within the memory module, for example, a power regulator component (power regulator component 306 of FIG. 3) and/or a power supply component (power supply component 304 of FIG. 3). In accordance with another aspect of the disclosed subject matter, the memory module, wireless adapter component (e.g., wireless adapter component 106 of FIG. 1), antenna component (antenna component 302 of FIG. 3) or a combination thereof can monitor the different frequencies that can correspond with the different wireless protocols and select the optimum wireless protocol to use with a particular host component. For example, the wireless adapter component can receive information from a particular host component via more than one wireless communication protocol, and the wireless adapter component can then select the optimal wireless communication protocol to use based on the such criteria depicted herein (e.g., distance between the memory module and the host component, the available power remaining within the memory module, etc.). In accordance with yet another embodiment of the disclosed subject matter, the memory module can be adapted to accommodate only one type of wireless protocol (e.g., Bluetooth), wherein the only wireless communication protocol that can be established between the memory module and the host component is the one wireless protocol that is available (e.g., Bluetooth). It is to be appreciated that such an embodiment can be used (e.g., wherein only one wireless communication protocol is available) to accommodate a lower-cost memory module that can facilitate transmitting and storing data via a wireless communications link.

It is to be appreciated that such information such as device address(es), device name(s), available service(s), protocols, etc., can be transferred between the memory module and the host component, for example, when the selection of wireless communication is being made. The memory module and the host component can also (e.g., if both have the ability to communicate by two or more different wireless protocols) select the optimum wireless protocol to facilitate expeditious transfer of data, commands, opcode, etc., between the memory module and the host component. Selection of wireless protocol to be used can be based upon such criteria as transmittal distance between the memory module and the host component, rate of data transfer, signal quality (e.g., signal strength, interference, operating environment, etc.), and available power (e.g., Bluetooth can use less power than Wi-Fi, hence a memory module with low power can select to use Bluetooth protocol), for example.

At 1006 authentication information can be received. In accordance with one aspect of the disclosed subject matter, the host component can send authentication information to the memory module, wherein an authentication component (e.g., authentication component 406 of FIG. 4) can determine if the host component or the user that can be associated with the host component is authorized to access the data that can be associated with memory module (e.g., memory component 104 of FIG. 1). In accordance with one aspect of the disclosed subject matter, the wireless adapter component in conjunction with the antenna component, for example, can request that the host component provide proper authentication information to be able to associate with the memory module. For example, an authentication process can be employed, and can involve such procedures as the user of the host component requesting access to one or more memory components (e.g., memory components 502 through 506 of FIG. 5) associated with the memory module to enter a password, PIN, etc., prior to being granted access of the memory components. Alternatively or in addition, the user of the host component can, prior to access being granted, have to satisfy authentication based in part on biometric modalities such as the recognition of fingerprint(s), iris, facial features, speech, etc. In another embodiment, the memory module and associated components (e.g., antenna component 302 of FIG. 3, memory controller component 308 of FIG. 3, cryptographic component 404 of FIG. 4) and the host component, can authenticate with each other using trusted third parties to vet, and affirm, the identity of both devices using such processes as public key certificates.

At 1008, the host component can request that data be transmitted to/from the memory module. In accordance with one aspect of the disclosed subject matter, the host component can send a read request to the memory module, and the memory controller component (e.g., memory controller component 308 of FIG. 3) can facilitate configuring the memory module to facilitate executing the read request. In one aspect, the memory controller component can store the read request into a queue component (e.g., one of the queue components 514 through 516 of FIG. 5). For example, during a period of high traffic (e.g., when multiple host components are accessing one or more of the memory components contained within the memory module). When the memory controller component executes the read request, for example, the memory controller component can utilize one or more buffer component(s) (e.g., buffer components 508 through 512 of FIG. 5) to buffer the data that can facilitate efficient data transfer rates.

At 1010, the data can be transmitted. In accordance with one aspect of the disclosed subject matter, the memory controller component can read the data directly from a memory component (e.g., memory component 104 of FIG. 1) and transfer the data to the host component via the wireless adapter component that can employ the use of an antenna component (e.g., antenna component 302 of FIG. 3) to facilitate converting the digital information to be transmitted wirelessly via the selected wireless communication protocol, for example. In accordance with another aspect of the disclosed subject matter, the memory controller component can read the data from one or more buffer components wherein the data can be stored, and the wireless adapter component and antenna component can, for example, facilitate transmitting the data to the host component using the selected wireless communication protocol, for example. At this point, methodology 1000 can end.

Figure 11:
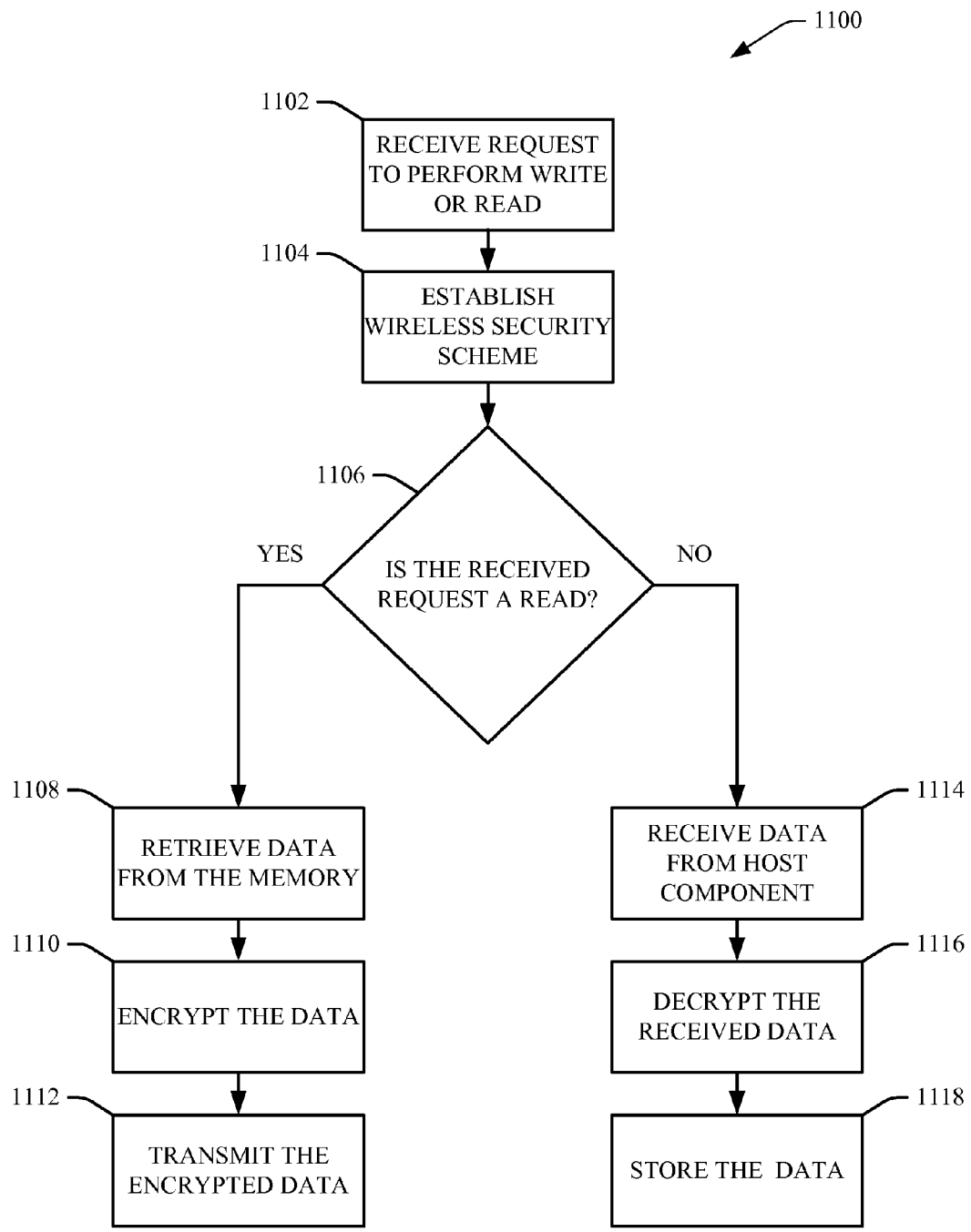
FIG. 11 depicts a methodology that can facilitate encrypting and decrypting data associated with a memory in accordance with an aspect of the disclosed subject matter.

Referring to FIG. 11, a methodology 1100 that facilitates wireless access of a memory in accordance with the disclosed subject matter is illustrated. At 1102, a write or receive request can be received. In accordance with one aspect of the disclosed subject matter, a memory module (memory module 102 of FIG. 1, FIG. 2a, FIG. 2b, FIG. 2c, FIG. 3, FIG. 5, etc.) can receive a request from host component (e.g., one of the host components 202 of FIG. 3, FIG. 5, etc.) to read data from a memory component (e.g., memory component 104 of FIG. 1, memory components 502 through 506 of FIG. 5) or write data to the memory component(s) that can be associated with the memory module via a wireless communication protocol.

At 1104, a wireless security scheme can be established. It is to be appreciated that, that a wireless encryption scheme can be employed to facilitate preventing or substantially minimizing the susceptibility of an unauthorized third party from intercepting and/or altering data transmissions between the memory module and an authorized host component. A wireless communication scheme can, for example, include a key derivation with custom algorithms based on a secure and fast encryption routine (SAFER) block cipher (e.g., for Bluetooth connections). In accordance with one aspect of the disclosed subject matter, an "E0" cipher stream can use random numbers (e.g., pseudorandom numbers) that can be generated by a random number generator (e.g., random number generation component 408 of FIG. 4) that can be utilized for an encryption scheme.

In accordance with another aspect of the disclosed subject matter, a wireless security scheme can be selected by a security component (security component 310 of FIG. 3), for example, that can facilitate the encryption and decryption of data that can be transmitted from and/or to the memory module. The security component can, for example, facilitate using such cryptography of data that can be, but not limited to, Wired Equivalent Privacy (WEP), Extensible Authorization Protocol (EAP), Protected EAP (PEAP), Transport Layer Security (TLS), Tunneled TLS (TTLS), IP Security Protocol (IPSec), RC4 cipher, Data Encryption Standard (DES), 3DES, Advanced Encryption Standard (AES), Temporal Key Integrity Protocol (TKIP) etc. Such encryption/decryption schemes can, for example, be employed for one or more of the wireless communication protocols (e.g., Wi-Fi, Bluetooth) that can be available between a memory module and host component. It is to be appreciated that the number of different wireless protocols that can be used is not delimited to the wireless security protocols depicted herein, and that the disclosed subject matter contemplates that other wireless security protocols can be used.

It is to be appreciated that the disclosed subject matter contemplates that the establishment of the wireless security scheme (e.g., at reference numeral 1104) can take place before, during, or after the memory module receives a request to read or write data to the memory component (e.g., as depicted in reference numeral 1102). For example, a wireless security scheme can be established when the memory module and the host component come within wireless communication range and the wireless security scheme can remain the same until the memory module and the host component are no longer within wireless communication range. In another aspect, the wireless security scheme can change from one data transfer to another transfer while the memory module and the host component continuously remain within wireless communication range, for example.

At 1106, it can be determined if the memory access request is a read or a write. For example, a wireless adapter component (wireless adapter component 106 of FIG. 1) and/or a memory controller component (e.g., memory controller component 308 of FIG. 3) can receive the request and determine the host component is requesting to store data into the memory component or retrieve data from the memory component. If, at 1106, it is determined that the memory access request is a data read, at 1108, the requested data can be retrieved. In accordance with one aspect of the disclosed subject matter, the memory controller component can retrieve the data from the memory component and transfer the data to a security component (e.g., security component 310 of FIG. 3) to be encrypted. In accordance with another aspect of the disclosed subject matter, the memory controller component can (e.g., temporarily) store the data in a buffer component (e.g., one or more of the buffer components 508 through 512 of FIG. 5) until the memory module can execute the transmission of the data, for example.

At 1110, the data can be encrypted. In accordance with one aspect of the disclosed subject matter, the memory controller component can facilitate transferring the requested data from the memory component to the security component, wherein the security component can facilitate performing one or more security algorithms on the data based on the type of wireless communication that was established at reference numeral 1104, for example.

At 1112, the encrypted data can be transmitted. In accordance with one aspect of the disclosed subject matter, the memory controller component can facilitate transferring the data from the security component to the wireless adapter component. The wireless adapter component can, for example, wirelessly transmit the encrypted data via the antenna component (antenna component 302 of FIG. 3), wherein the host component can receive the encrypted data via a wireless communication protocol that can be known between the memory module and the host component, for example.

Returning back to reference number 1106, if it is determined that the memory access request was not a read, then, at 1114, the memory module can receive data from a host component. In accordance with one aspect of the disclosed subject matter, the host component can send the data to the memory module, wherein the host component can have encrypted the data prior to sending the data to memory module using the wireless security scheme that was established at reference numeral 1104, for example.

At 1116, the received data can be decrypted. In accordance with one aspect of the disclosed subject matter, the memory controller component can transfer the data that the memory module receives from the host component the security component, wherein the security component can utilize a cryptographic component (e.g., cryptographic component 404 of FIG. 4) to decrypt the data, for example. In accordance with one aspect of the disclosed subject matter, the security component in conjunction with one or more sub-components (e.g., an authentication component 406 of FIG. 4, a cryptographic component 404 of FIG. 4, a processor component 402 of FIG. 4, etc.) can decrypt the data in accordance with the wireless security scheme established at reference numeral 1104.

At 1118, the data can be stored. In accordance with one aspect of the disclosed subject matter, the memory controller component can facilitate transferring the data to one or more memory components (e.g., memory components 502 through 506 of FIG. 5) that can be associated with the memory module, for example. In accordance with another aspect of the disclosed subject matter, the memory controller component can facilitate transferring the data to one or more buffer components (e.g., buffer components 508 through 512 of FIG. 5) if the one or more memory component is busy, for example. At this point, methodology 1100 can end.

Figure 12:
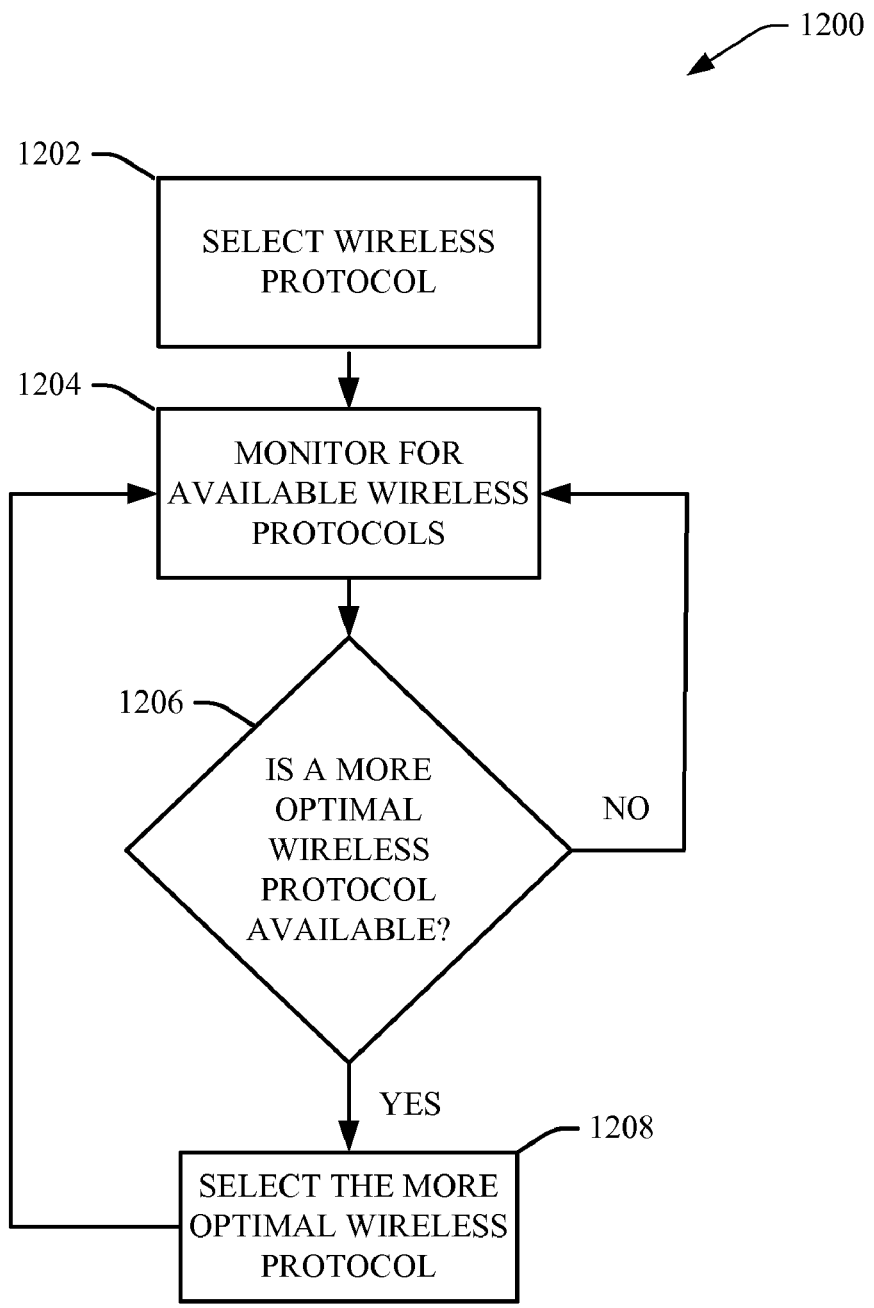
FIG. 12 depicts a methodology that can facilitate choosing an optimal wireless communication protocol for storing data to a memory in accordance with an aspect of the disclosed subject matter.

Referring to FIG. 12, a methodology 1200 that facilitates the selection of a wireless protocol to store data in memory in accordance with the disclosed subject matter is illustrated. At 1202, a wireless protocol can be selected. In accordance with one aspect of the disclosed subject matter, a memory module (e.g., memory module 102 of FIG. 1) can establish a connection with a host component wherein the memory module can, for example, establish a wireless protocol (e.g., Bluetooth, Wi-Fi, Wi-Max, IR, etc.) the host component has available to communicate with the memory module. For example, the host component can have two types of wireless protocols (e.g., Wi-Fi and Bluetooth) and can transmit such information to the memory module via either of the two available wireless protocols. The wireless adapter component in conjunction with the memory controller component, for example, can determine the optimum wireless protocol to use with the host component. Such a selection can, for example, be based on the distance the host component is from the memory module, the amount of power the memory module has available, the speed at which the data is required to be transferred, the quality of the signal of one wireless protocol over another, the strength of the signal of one wireless protocol over another etc.

At 1204, the available wireless protocols can be monitored. In accordance with one aspect of the disclosed subject matter, a wireless adapter component (e.g., wireless adapter component 106 of FIG. 1) in conjunction with an antenna component (e.g., antenna component 302 of FIG. 3) can, for example, monitor the various wireless protocols (e.g., the associated frequencies) that may be available for a particular host component.

At 1206, a determination can be made as to whether a more optimal wireless protocol is available. In accordance with one aspect of the disclosed subject matter, a memory controller component (e.g., memory controller component 308 of FIG. 3) and/or the wireless adapter component can compare such information as the signal strength of the available wireless protocols, the amount of power each wireless protocols can use, the amount of throughput that can be associated with the available wireless protocols, and can, for example, determine if a more optimal wireless protocol is available for a particular host component, for example. If it is determined that there is not another wireless protocol that is more optimal available, then, returning back to reference numeral 1204, the available wireless protocols can be monitored again.

If, at 1206, it was determined that a more optimal wireless protocol is available, at 1208, the more optimal wireless protocol can be selected (e.g., dynamically selected or switched). The memory module (e.g., the wireless adapter component and/or memory controller component) can, for example, instruct the host component to select and switch (e.g., dynamically switch) to another wireless protocol, wherein the memory module can facilitate the process of authentication of the host component on the other wireless protocol. For example, if the host component is utilizing a first wireless protocol (e.g., Bluetooth) to communicate with the memory module, the memory module (e.g., via the wireless adapter component and/or memory controller component) can switch (e.g., dynamically switch) to a second wireless protocol (e.g., Wi-Fi) if the host component travels outside of the effective range of the first wireless protocol, for example. In one aspect, the switching from one protocol to another protocol can be performed automatically. In another aspect, a user can be prompted and informed that a more desirable (e.g., more optimal) protocol or type of wireless communication is available and can query the user as to whether the user desires to switch from the current protocol to the more desirable protocol. After the more optimal wireless protocol is selected, returning back to reference numeral 1204, the memory module can again monitor the other available wireless protocols that can be available for a particular host component. At this point, methodology 1200 can end.

Figure 13:
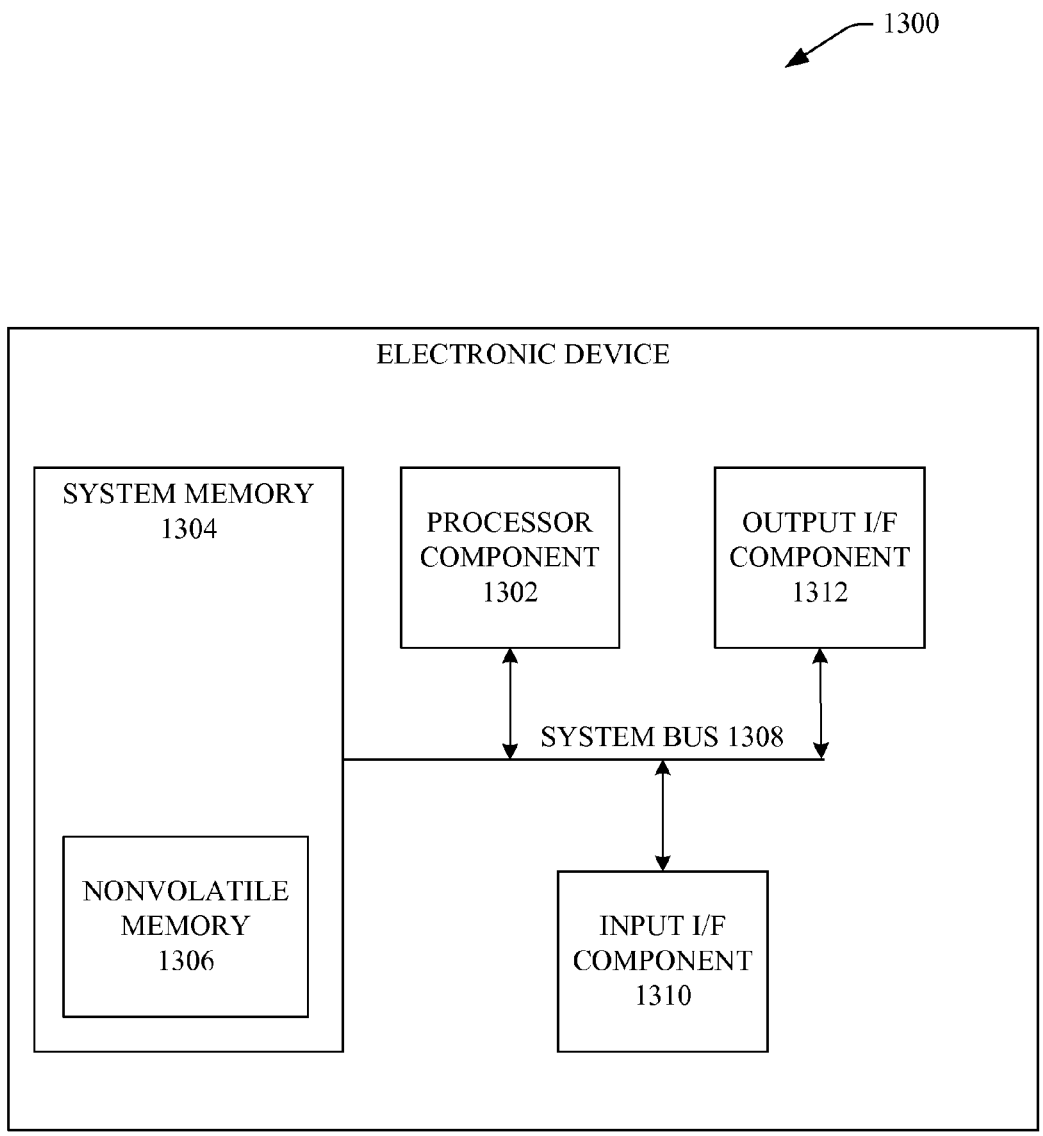
FIG. 13 illustrates an example of an electronic device that can be associated with a memory in accordance with an aspect of the disclosed subject matter.

Referring to FIG. 13, illustrated is a block diagram of an exemplary, non-limiting electronic device 1300 that can comprise and/or incorporate system 100, system 200, memory device 300, system 400, and/or system 500, system 600, system 700, system 800, or a respective portion(s) thereof. The electronic device 1300 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1300 can include, but are not limited to, a processor component 1302 (e.g., which can be and/or can include the same or similar functionality as processor component 402, as depicted in FIG. 4 and described herein), a system memory 1304, which can contain a nonvolatile memory 1306, and a system bus 1308 that can couple various system components including the system memory 1304 to the processor component 1302. The system bus 1308 can be any of several types of bus structures including a memory bus or memory controller, a peripheral bus, or a local bus using any of a variety of bus architectures.

Electronic device 1300 can typically include a variety of computer readable media. Computer readable media can be any available media that can be accessed by the electronic device 1300. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1306 (e.g., that can be fabricated using nano-technology or other memory technology), CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1300. Communication media typically embodies computer readable instructions, data structures, program modules or other data in a modulated data signal such as a carrier wave or other transport mechanism and includes any information delivery media.

The system memory 1304 can include computer storage media in the form of volatile (e.g., SRAM) and/or nonvolatile memory 1306 (e.g., flash memory). For example, the system memory 1304 can comprise, and/or can be the same or similar as, and/or can contain the same or similar functionality as, a memory module 102 (e.g., as described herein with regard to system 100, system 200, system 500, system 600, etc.). A basic input/output system (BIOS), containing the basic routines that can facilitate transferring information between elements within electronic device 1300, such as during start-up, can be stored in the system memory 1304. The system memory 1304 typically also can contain data and/or program modules that can be accessible to and/or presently be operated on by the processor component 1302. By way of example, and not limitation, the system memory 1304 can also include an operating system(s), application programs, other program modules, and program data.

The nonvolatile memory 1306 can be removable or non-removable. For example, the nonvolatile memory 1306 can be in the form of a removable memory card or a USB flash drive. In accordance with one aspect, the nonvolatile memory 1306 can include flash memory (e.g., single-bit flash memory, multi-bit flash memory), ROM, PROM, EPROM, EEPROM, or NVRAM (e.g., FeRAM), or a combination thereof, for example. Further, a flash memory can comprise NOR flash memory and/or NAND flash memory.

A user can enter commands and information into the electronic device 1300 through input devices (not shown) such as a keypad, microphone, tablet, or touch screen although other input devices can also be utilized. These and other input devices can be connected to the processor component 1302 through input interface component 1310 that can be connected to the system bus 1308. Other interface and bus structures, such as a parallel port, game port or a universal serial bus (USB) can also be utilized. A graphics subsystem (not shown) can also be connected to the system bus 1308. A display device (not shown) can be also connected to the system bus 1308 via an interface, such as output interface component 1312, which can in turn communicate with video memory. In addition to a display, the electronic device 1300 can also include other peripheral output devices such as speakers (not shown), which can be connected through output interface component 1312.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, cellular phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof, to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates wireless access of data, comprising:
   a memory module comprising a plurality of memory locations to facilitate data storage, wherein the memory module is configured to facilitate wireless communication of data between the memory module and at least one host component based in part on predetermined criteria; and
   a memory controller component configured to, during the wireless communication of the data between the memory module and the at least one host component, establish a first wireless communication link between the memory module and the at least one host component, transfer a first subset of the data between the memory module and the at least one host component via the first wireless communication link, dynamically identify a second wireless communication link between the memory module and the at least one host component that is more efficient for transferring at least a portion of the data than the first wireless communication link, dynamically switch from the first wireless communication link to establish the second wireless communication link during the wireless communication of the data in response to determining that the wireless communication of the at least a portion of the data between the memory module and the at least one host component is more efficient via the second wireless communication link than via the first wireless communication link, in accordance with the predetermined criteria, and transfer a second subset of the data between the memory module and the at least one host component via the second wireless communication link, wherein the first wireless communication link is associated with a first wireless communication protocol and the second wireless communication link is associated with a second wireless communication protocol.

2. The system of claim 1, wherein data is transferred between the memory module and the at least one host component that utilizes a wireless protocol to transfer the data between the memory module and the at least one host component in an ad-hoc or peer-to-peer configuration.

3. The system of claim 1, wherein the data is transferred between the memory module and two or more host components at a same time or substantially the same time.

4. The system of claim 1, wherein the memory module acts as a host or a central broadcasting point.

5. The system of claim 4, wherein an access point (AP) component facilitates wireless communication between the memory module and a local area network (LAN) or wireless local area network (WLAN).

6. The system of claim 1, further comprising a wireless adapter component configured to facilitate wireless communication between the memory module, and the at least one host component is configured to utilize at least one of Bluetooth, Wi-Fi, Wi-Max, or Zigbee to wirelessly transfer the data between the memory module and the at least one host component.

7. The system of claim 1, further comprising an antenna component configured to facilitate conversion of the data from electrical signals to electromagnetic waves and conversion of electromagnetic waves to electrical signals.

8. The system of claim 1, further comprising a power source component, wherein the power source component is configured to facilitate supply of power to the memory module to facilitate the wireless transfer of the data.

9. The system of claim 1, further comprising a power regulator component configured to regulate one or more voltages or currents to one or more components contained in the memory module.

10. The system of claim 1, further comprising at least one of:
   a buffer component configured to buffer the data to facilitate the wireless communication of the data, or a queue component configured to queue requests or commands associated with the wireless communication of the data between the memory module and the at least one host component.

11. The system of claim 1, wherein the predetermined criteria is related to an amount of remaining power associated with the memory module, a strength of a wireless signal between the memory module and the at least one host component, respective transmission speeds associated with different types of wireless communication, a number of host components that are in communication with the memory module, an amount of interference associated with a particular wireless communication, or a signal quality of a particular wireless communication.

12. The system of claim 1, wherein the memory module comprises at least one authentication component configured to control access to the data, wherein access to the data is granted upon presentation of authentication credentials associated with the at least one host component.

13. The system of claim 1, wherein the memory module comprises a cryptographic component configured to at least one of encrypt or decrypt the data that is wirelessly transferred between the memory module and the at least one host component.

14. An electronic device comprising the system of claim 1.

15. The electronic device of claim 14, the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with a motor vehicle, a global positioning satellite (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

16. A method that facilitates wirelessly communicating data, comprising:
employing at least one processor to facilitate execution of code instructions retained in a memory, the code instructions, in response to execution, perform acts comprising:
establishing a first wireless communication link between a memory module and at least one host component based in part on predetermined criteria to facilitate a wireless transfer of a first subset of data of a set of data;
transferring the first subset of data between the memory module and the at least one host component via the first wireless communication link;
automatically identifying a second wireless communication link between the memory module and the at least one host component that is more optimal for transferring at least a portion of the set of data than the first wireless communication link based in part on the predetermined criteria;
automatically switching from the first wireless communication link to establish the second communication link during the wireless transfer of the set of data; and
transferring a second subset of data of the set of data between the memory module and the at least one host component via the second wireless communication link.

17. The method of claim 16, further comprising:
placing the memory module within wireless communication range of the at least one host component;
selecting a wireless protocol to transfer the data between the memory module and the at least one host component;
receiving authentication information from the at least one host component; and
granting access to the data associated with the memory module based in part on the received authentication information.

18. The method of claim 17, further comprising:
monitoring for availability of other wireless communication protocols;
determining an optimal wireless communication protocol available; and
selecting the optimal wireless communication protocol available to facilitate transfers between the memory module and the at least one host component.

19. The method of claim 16, further comprising:
receiving at least one of:
a request to read the data from the memory module, or
a request to write data to the memory module;
encrypting the data that is read from the memory module; and
decrypting the data that is written to the memory module.

20. The method of claim 16, wherein the predetermined criteria is related to an amount of remaining power associated with the memory module, a strength of a wireless signal between the memory module and the at least one host component, respective transmission speeds associated with different types of wireless communication, a number of host components that are in communication with the memory module, an amount of interference associated with a particular wireless communication protocol, or a signal quality of a particular wireless communication protocol.

* * * * *